(12) United States Patent
Miyazaki et al.

(10) Patent No.: US 8,898,685 B2
(45) Date of Patent: Nov. 25, 2014

(54) LOADING MECHANISM FOR CARTRIDGE DRIVE APPARATUS

(71) Applicant: Sony Corporation, Tokyo (JP)

(72) Inventors: Akihiro Miyazaki, Kanagawa (JP); Satoshi Muto, Chiba (JP); Hideyuki Takagi, Shizuoka (JP); Kenji Horiuchi, Kanagawa (JP); Tomio Hironaka, Kanagawa (JP); Takuji Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/033,618

(22) Filed: Sep. 23, 2013

(65) Prior Publication Data

US 2014/0089951 A1    Mar. 27, 2014

(30) Foreign Application Priority Data

Sep. 27, 2012  (JP) .................................. 2012-214337

(51) Int. Cl.
| | |
|---|---|
| G11B 15/68 | (2006.01) |
| G11B 17/038 | (2006.01) |
| G11B 23/03 | (2006.01) |
| G11B 17/22 | (2006.01) |

(52) U.S. Cl.
CPC .......... *G11B 17/038* (2013.01); *G11B 23/0323* (2013.01); *G11B 17/22* (2013.01)
USPC ........................ 720/615; 369/30.69; 360/92.1

(58) Field of Classification Search
USPC .............. 720/714, 715, 632; 369/30.4, 30.41, 369/30.42, 30.53, 30.54, 30.68, 30.69; 360/92.1
See application file for complete search history.

(56) References Cited

U.S. PATENT DOCUMENTS

| | | | | |
|---|---|---|---|---|
| 5,327,309 | A * | 7/1994 | Takamiya et al. | 360/99.02 |
| 5,701,290 | A * | 12/1997 | Okada | 720/673 |
| 6,487,159 | B1 * | 11/2002 | Hamada | 720/632 |
| 6,829,773 | B1 * | 12/2004 | Kojima | 720/640 |
| 6,842,907 | B2 * | 1/2005 | Nakanishi et al. | 720/600 |
| 7,365,946 | B2 * | 4/2008 | Nakamura et al. | 360/255.2 |
| 8,281,327 | B2 * | 10/2012 | Goto et al. | 720/615 |
| 8,356,312 | B2 * | 1/2013 | Takasawa et al. | 720/615 |
| 8,607,254 | B2 * | 12/2013 | Takasawa et al. | 720/632 |
| 8,675,302 | B2 * | 3/2014 | Hashimoto | 360/92.1 |
| 2001/0012260 | A1 * | 8/2001 | Tamiya et al. | 369/192 |
| 2006/0143625 | A1 * | 6/2006 | Chuo | 720/614 |
| 2007/0283369 | A1 * | 12/2007 | Schoenfeld et al. | 720/632 |

FOREIGN PATENT DOCUMENTS

JP         2011-108315         6/2011

* cited by examiner

*Primary Examiner* — Brian Miller
(74) *Attorney, Agent, or Firm* — Sony Corporation

(57) ABSTRACT

A cartridge drive apparatus includes a holder, a lock plate, and a drive unit. The holder is configured to hold a cartridge inserted therein. The lock plate is attached with respect to the holder to be movable in one of an insertion direction and a discharge direction of the cartridge and includes a locking mechanism configured to lock the cartridge. The drive unit is configured to drive the holder and the lock plate in one of the insertion direction and the discharge direction of the cartridge.

9 Claims, 18 Drawing Sheets

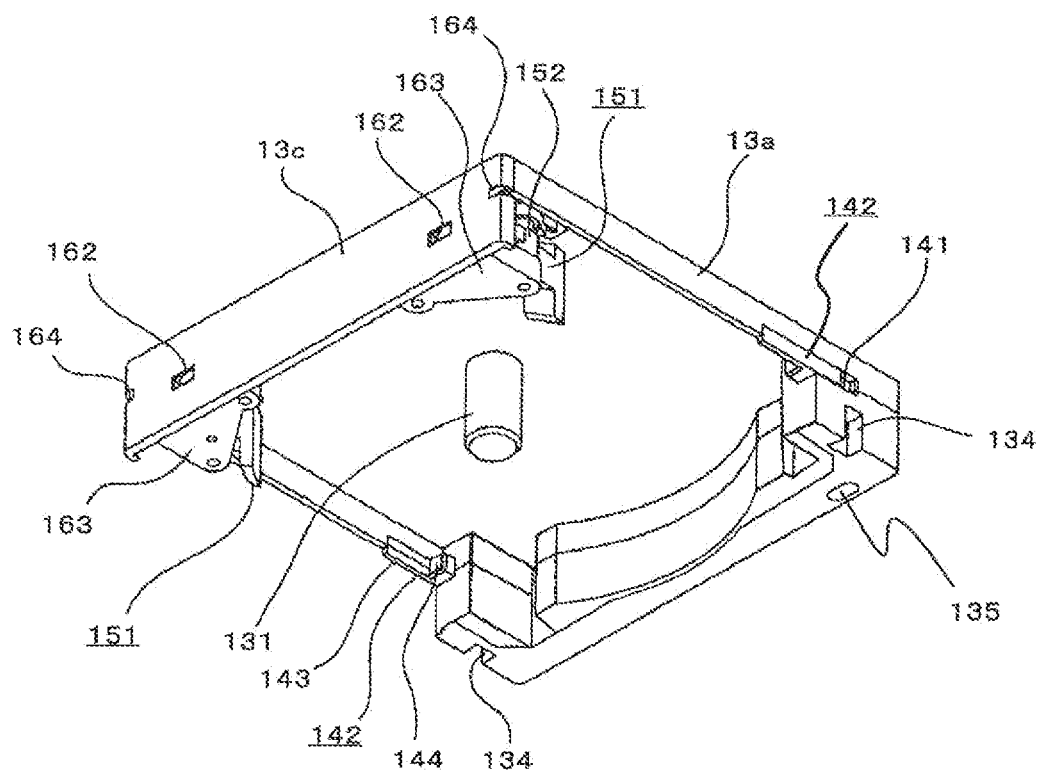
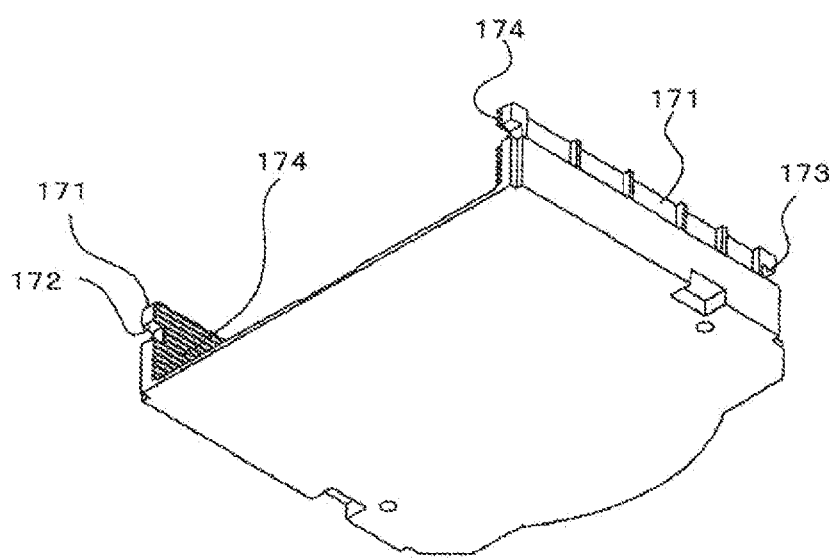
FIG.4

LOADING MECHANISM FOR CARTRIDGE DRIVE APPARATUS

CROSS REFERENCE TO RELATED APPLICATIONS

This application claims the benefit, of priority under 35 U.S.C. §119 from Japanese Priority Patent Application JP 2012-214337 filed Sep. 27, 2012, the entire contents of each which is incorporated herein by reference.

BACKGROUND

The present disclosure relates to a cartridge drive apparatus, which can be reduced in size and enables a loading operation of a cartridge to be reliably performed.

In related art, there are widely used cartridge drive apparatuses each capable of recording and/or reproducing information using a recording medium (for example, optical disc) housed in a cartridge. In such an apparatus, a loading mechanism is provided. The cartridge is transported into a casing and the recording medium is mounted on a drive unit (see Japanese Patent Application Laid-open No. 2011-108315 (hereinafter, referred to as Patent Document 1)).

SUMMARY

By the way, when the cartridge is reduced in size, if the loading amount is not increased upon discharge of the cartridge, the amount of projection from the cartridge drive apparatus decreases, and it becomes difficult to take the cartridge out of the cartridge drive apparatus. However, it becomes difficult to reduce the size of the cartridge drive apparatus when the loading amount simply increases. Further, in the cartridge drive apparatus, it is favorable to more reliably perform the loading operation upon insertion and discharge of the cartridge.

In view of this, it is desirable to provide a cartridge drive apparatus that can be reduced in size and is capable of reliably performing a loading operation of a cartridge.

According to an embodiment of the present disclosure, there is provided a cartridge drive apparatus including a holder, a lock plate, and a drive unit.

The holder is configured to hold a cartridge inserted therein.

The lock plate is attached with respect to the holder to be movable in one of an insertion direction and a discharge direction of the cartridge and includes a locking mechanism configured to lock the cartridge.

The drive unit is configured to drive the holder and the lock plate in one of the insertion direction and the discharge direction of the cartridge.

In this embodiment, the holder configured to hold the cartridge inserted therein and the lock plate that is attached with respect to the holder to foe movable in one of the insertion direction and the discharge direction of the cartridge and includes the locking mechanism configured to lock the cartridge are provided. In the drive unit configured to drive the holder and the lock plate in one of the insertion direction and the discharge direction of the cartridge, for example, a first gear and a second gear having a larger diameter than a diameter of the first gear are used to drive the holder through the first gear and the second gear through the lock plate. Further, the lock plate is provided with a discharge control mechanism configured to set, upon discharge of the inserted cartridge, the locking mechanism to be in a lock-released state in cooperation with a cartridge discharge operation. Further, the lock plate is provided with a pressing mechanism configured to press the cartridge in the discharge direction, and the discharge control mechanism is configured to press, after setting to the lock-released state, the cartridge through the pressing mechanism in the discharge direction. Further, the lock plate is moved in the discharge direction of the cartridge in a state in which, the discharge control mechanism abuts against a release shaft, and the locking mechanism is set to be in the lock-released state. Further, the lock plate is further moved in the discharge direction of the cartridge, and the cartridge is pressed by the pressing mechanism in the discharge direction. In addition, the lock plate is moved in the discharge direction of the cartridge, the discharge control mechanism is slid on a reset shaft after the discharge control mechanism is released from the abutting state against the release shaft, and the discharge control mechanism is restored to an initial position.

According to the embodiment of the present disclosure, the holder configured to hold the cartridge inserted therein, the lock plate that is attached with respect to the holder to be movable in one of the insertion direction and the discharge direction of the cartridge and includes the locking mechanism configured to lock the cartridge, and the drive unit configured to drive the holder and the lock plate in one of the insertion direction and the discharge direction of the cartridge are provided. Therefore, it becomes possible to move the cartridge by the amount of movement of the lock plate in addition to the amount of movement of the holder. Further, the lock plate includes the locking mechanism configured to lock the cartridge. Therefore, it becomes possible to reduce the size and reliably perform a loading operation of the cartridge.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 4 is a perspective view of the state in which the first shell and the second shell are separated from each other as viewed, in a different direction;

DETAILED DESCRIPTION OF EMBODIMENTS

Hereinafter, embodiments for carrying out the present disclosure will be described. Note that, the descriptions will be made in the following order.
1. Entire Configuration
2. Configuration of Cartridge
3. Configuration of Selection Loader in Cartridge Drive Apparatus
4. Insertion and Discharge Operations of Cartridge <1. Entire Configuration>

Figure 1:
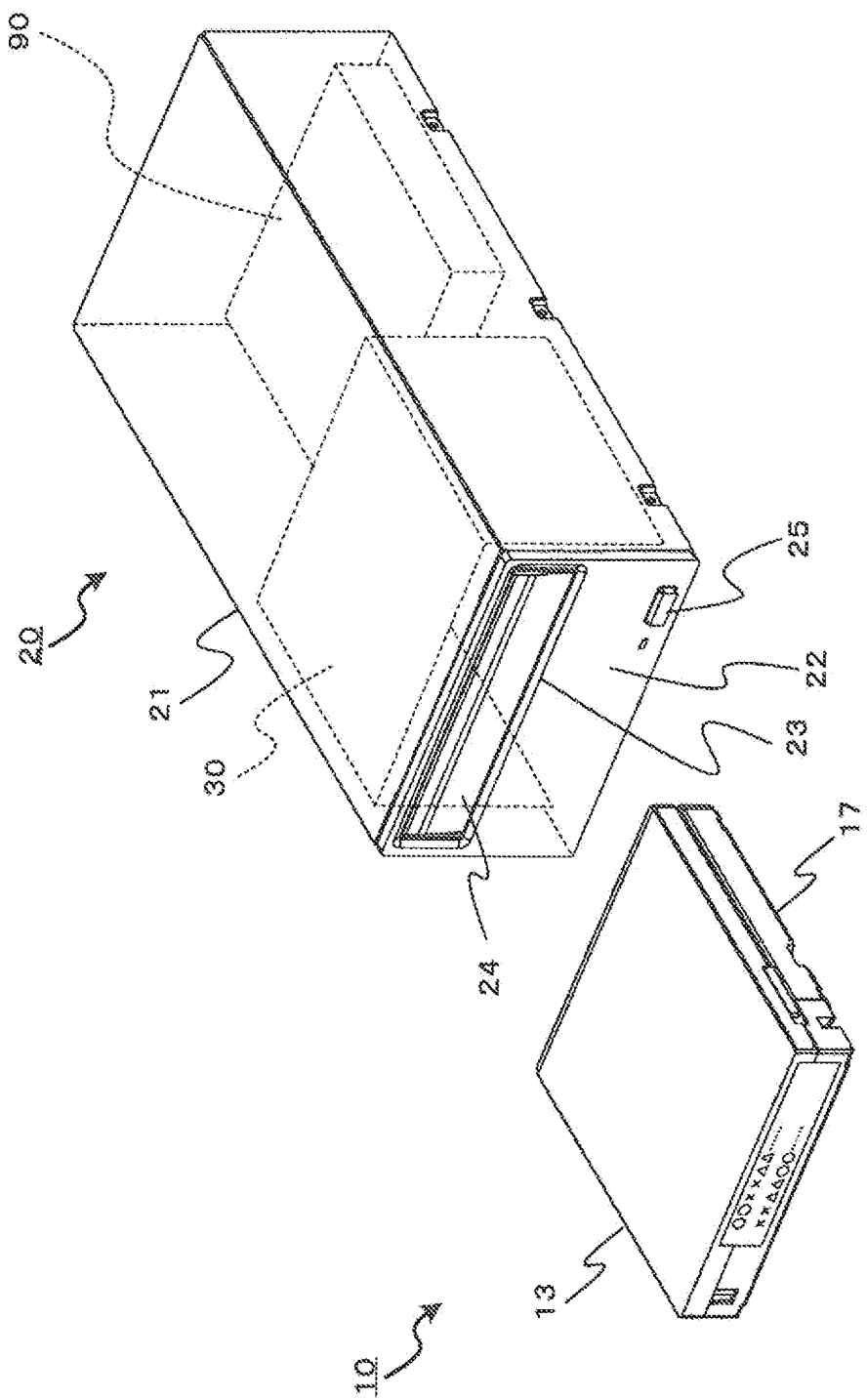
FIG. 1 is a perspective, view showing a cartridge drive apparatus together with a cartridge.

FIG. 1 is a perspective view showing a cartridge drive apparatus according to the present disclosure together with a cartridge. The cartridge drive apparatus 20 performs recording/reproduction of an information signal and the like with respect to recording media, for example, a plurality of optical discs that are housed in a cartridge 10 inserted therein.

A selection loader 30 and a recording/reproduction unit 90 are provided at predetermined positions within an outer casing 21 in the cartridge drive apparatus 20. The selection loader 30 inserts or ejects the cartridge 10, and selects, from a plurality of optical discs housed in the cartridge 10, an optical disc on/from which an information signal is recorded/reproduced. The recording/reproduction unit 90 acquires the optical disc selected by the selection loader 30 from the selection loader 30, and records/reproduces an information signal or the like.

A front panel 22 is provided in a front surface of the outer casing 21. A cartridge insertion and removal port 23 passing through the front panel 22 in front and rear directions is formed at an upper end portion of the front panel 22. The cartridge insertion and removal port 23 can be opened and closed by a shutter 24. An eject button 25 is provided at a lower end portion of the front panel 22.

When the cartridge 10 is inserted into the cartridge drive apparatus 20 through the cartridge insertion and removal port 23, the selection loader 30 moves the cartridge 10 to a predetermined position such that a first shell 13 and a second shell 17 of the cartridge 10 are separated from each other. Further, the selection loader 30 selects a desired optical disc. In the recording/reproduction unit 90, the optical disc selected by the selection loader 30 is transported to a position at which the optical disc can be chucked. Then, an information signal or the like is recorded/reproduced. Further, when the recording/reproduction unit 90 terminates writing or reading of the information signal with respect to the optical disc, the recording/reproduction unit 90 inserts the optical disc to an original position in the cartridge 10 loaded in the selection loader 30. At the end of use of the cartridge 10, the selection loader 30 discharges the cartridge 10. The selection loader 30 couples the first shell 13 and the second shell 17 of the cartridge 10, and moves the coupled first shell 13 and second shell 17 to a predetermined position where the coupled first shell 13 and second shell 17 can be removed.

Hereinafter, a front side in the case where the cartridge 10 is inserted into the cartridge drive apparatus 20 from the front is referred to as a front surface, and a deep side opposed to the front surface is referred to as a rear surface.

<2. Configuration of Cartridge>

As shown in FIGS. 2 to 5, a casing of the cartridge 10 is constituted of the first shell 13 and the second shell 17. Further, recording media, for example, optical discs 100 can be housed at predetermined intervals in upper and lower directions within the cartridge 10.

The first shell 13 and the second shell 17 can be coupled/separated to/from each other in the upper and lower directions, for example.

The first shell 13 is made of a resin material. The first shell 13 includes a base body 13a and an auxiliary base 13b. The auxiliary base 13b is coupled to a lower front portion of the base body 13a. Further, a back panel 13c is coupled to a rear end surface of the base body 13a.

A center pin 131 is provided in the center of the base body 13a. The center pin 131 is formed in a cylindrical shape, projecting downward.

Further, support shafts 132 are provided at positions closer to the rear end of the base body 13a. The support shafts 132 are distant from each other in left- and right-hand directions. The support shafts 132 project downward. A spring-hook protrusion 133 is provided near each of the support shafts 132.

Grip portions 134 are formed at lower ends of both left and right end portions of the auxiliary base 13b. The grip portions 134 are each formed in a groove shape opened laterally and downward.

Slider support portions 141 are formed at positions closer to front ends in both left and right side surface portions of the first shell 13.

The support shafts 132 of the first shell 13 support lock levers 151 to be rotatable.

Figure 5:
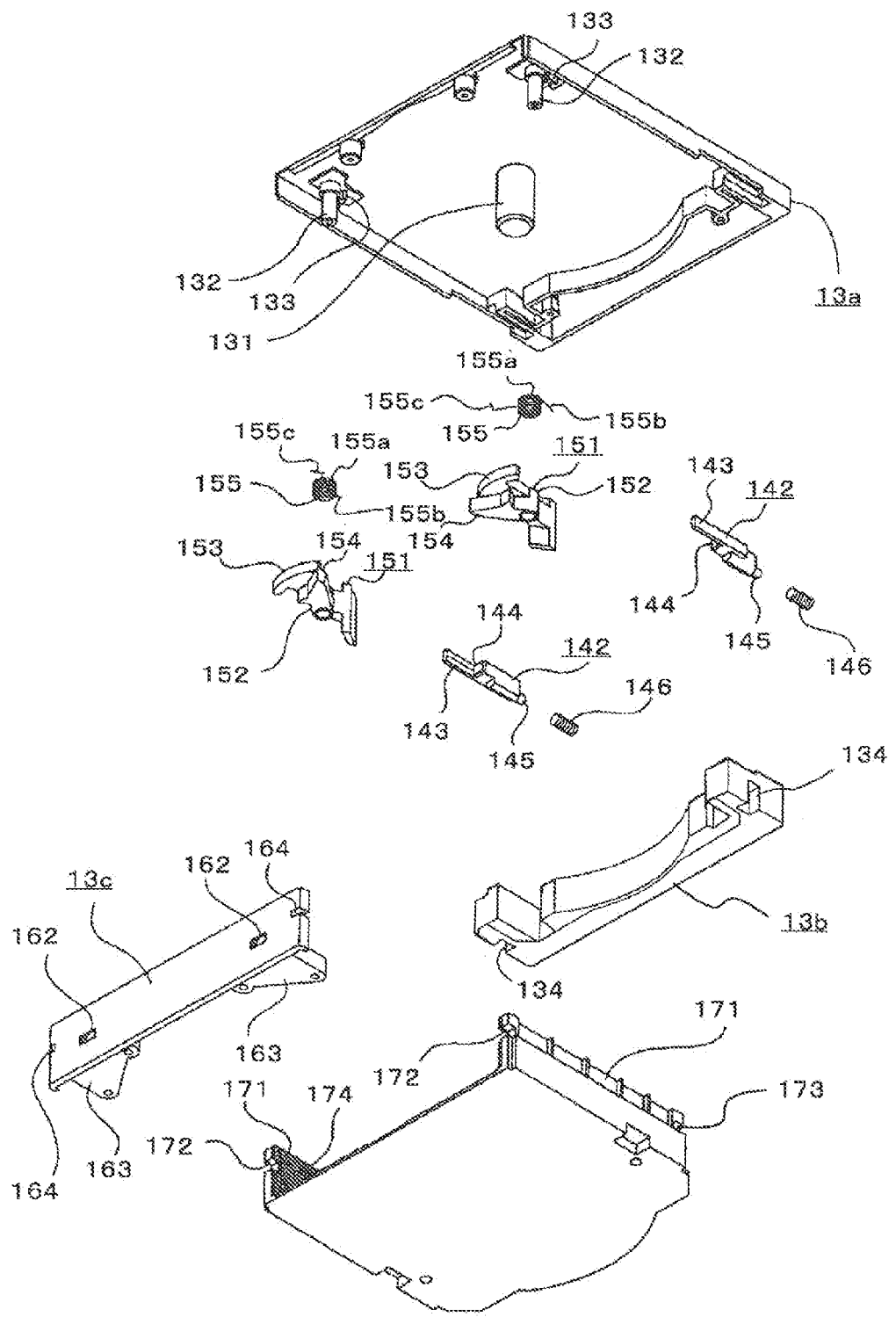
FIG. 5 is an exploded perspective view of the cartridge.
Figure 6:
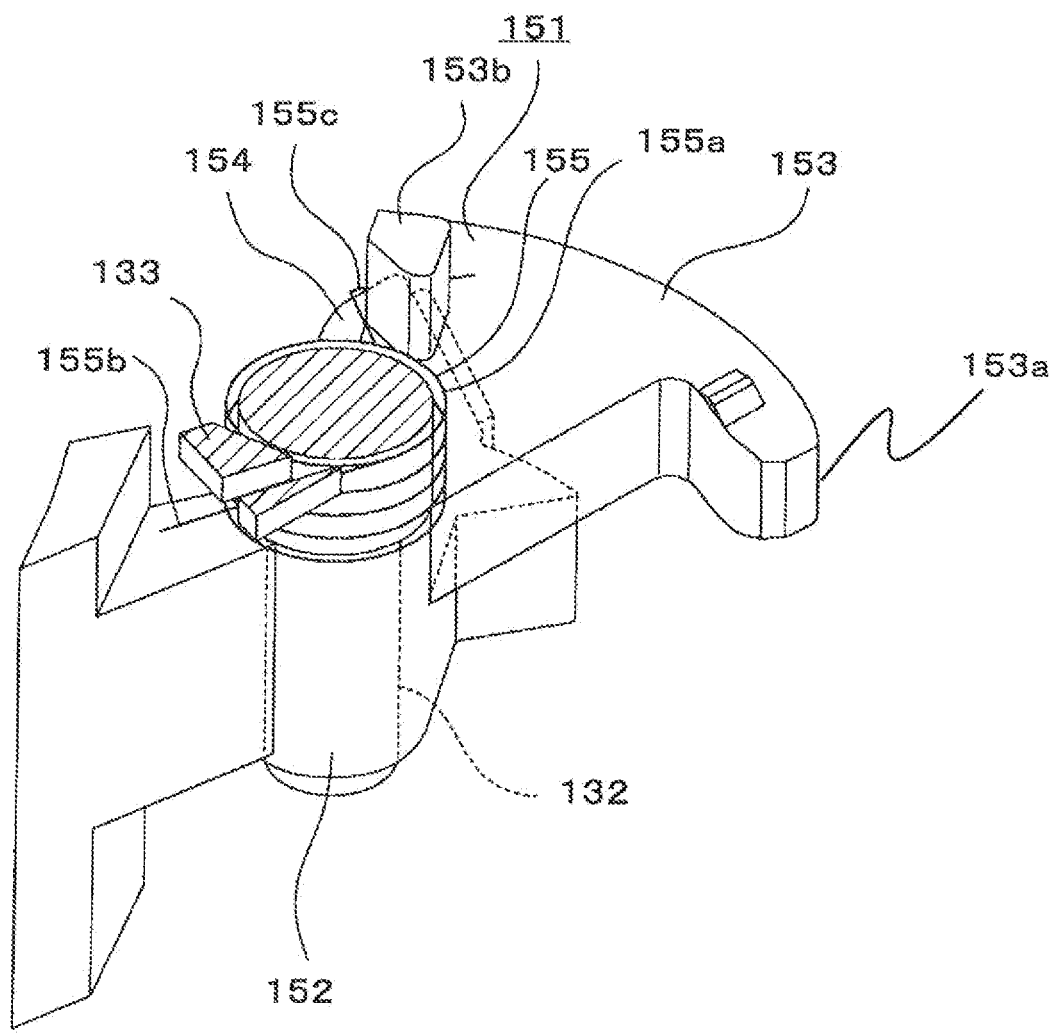
FIG. 6 is an enlarged perspective view showing a lock lever supported by a support shaft together with a biasing member.

As shown in FIGS. 4 to 6, each of the lock levers 151 includes a supported portion 152, a lock portion 153, and a lock release portion 154. The supported portion 152 is formed in a cylindrical shape. The support shaft 132 is inserted, into the supported portion 152 and the supported portion 152 is supported by the support shaft 132. The lock portion 153 is projected almost forward from an almost upper half part of the supported portion 152. The lock release portion 154 is projected obliquely forward from an almost lower half part of the supported portion 152.

The lock portion 153 includes a locking protrusion 153a. The locking protrusion 153a is projected, laterally from a leading end portion of the lock portion 153. A spring support protrusion 153b is formed in the lock portion 153. The spring support protrusion 153b is projected upward.

The support shaft 132 is inserted into the supported portion 152 and the lock lever 151 is rotatable about a center axis of the support shaft 132. Further, in a state in which the support shaft 132 is supported, the lock lever 151 is biased by a biasing member 155 in a direction in which the locking protrusion 153a of the lock portion 153 approaches a side surface.

The biasing member 155 is, for example, a coil spring. The biasing member 155 consists of a coil portion 155a and a pair of arm portions 155b and 155c. The pair of arm portions 155b and 155c are projected from the coil portion 155a. In the biasing member 155, the coil portion 155a is supported by the support shaft 132. One arm portion 155b is engaged to the spring-hook protrusion 133 provided to the first shell 13. The other arm portion 155c is engaged to the spring support protrusion 153b provided to the lock portion 153 of the lock lever 151.

The slider support portions 141 of the first shell 13 are supported such that lock sliders 142 are slidable in the front and rear directions.

Each of the lock sliders 142 consists of a supported portion 143, a lock portion 144, and a spring support shaft portion 145. The supported portion 143 extends in the front and rear directions. The lock portion 144 is projected, inward from a portion excluding a front end portion of the supported portion 143. The spring support shaft portion 145 is projected forward from a front surface, of the lock portion 144.

In each of the lock sliders 142, the supported portion 143 is supported by the slider support portion 141 of the first shell 13 to be slidable. A biasing member 146, for example, a coil spring is supported by the spring support shaft portion 145. The biasing member 146 has both ends to be brought into contact with a front surface of the lock portion 144 and a front surface of the slider support, portion 141. Therefore, the lock slider 142 is biased rearward by the biasing member 146.

The back panel 13c includes insertion holes 162 and attached protrusions 163. The insertion holes 162 are formed to be distant from each other in the left- and right-hand directions. The attached protrusions 163 are projected forward from a lower end portion of the back panel 13c. Further, insertion cutouts 164 are formed in both left and right end portions of the back panel 13c. The insertion cutouts 164 are each opened outwards.

The back panel 13c is attached to the base body 13a in such a manner that leading ends of the attached protrusions 163 are fixed to lower surfaces of the support shafts 132 with screws.

In the state in which the back panel 13c is attached to the base body 13a, the attached protrusions 163 are fixed on lower sides of the support shafts 132 with the screws. Thus, the lock levers 151 and the biasing members 155 supported by the support shafts 132 are prevented from falling out of the support shafts 132.

In the state in which the back panel 13c is attached to the base body 13a, the lock release portions 154 of the lock, levers 151 are located at the positions of the insertion holes 162.

The second shell 17 is made of a resin material. Inner walls 171 are provided inside side surfaces of the second shell 17. At rear end portions of the inner walls 171, first locking recesses 172 are formed. The first locking recesses 172 are opened rearwards and pass through the inner walls 171 in the left- and right-hand directions. Second locking recesses 173 are formed at positions closer to front ends of the inner walls 171. The second locking recesses 173 are opened forwards and outwards.

A plurality of holding grooves 174 for holding optical discs are formed at predetermined intervals in inner surfaces of the inner walls 171.

A bridge member 175 is attached at a position closer to a front end of the second shell 17 and between side surface portions of the second shell 17. The bridge member 175 is formed by bending a plate-like metal material into a predetermined shape. The bridge member 175 is attached between the side surface portions, and hence it is possible to ensure that the second shell 17 has high strength as a whole.

An information input sheet 19 is bonded to the cartridge 10 in the front surface of the first shell 13, for example. The information input sheet 19 serves as an information input means. Predetermined information is inputted into the information input sheet 19. The predetermined information includes, for example, information on a pitch between optical discs housed within the cartridge 10 and the number of optical discs housed. Note that the information input means is not limited to the information input sheet 19. Appropriate means may be used. The appropriate means includes, for example, printing information such as a barcode printed in the first shell 13 or the like and a recording chip embedded in the first shell 13 or the like.

Figure 2:
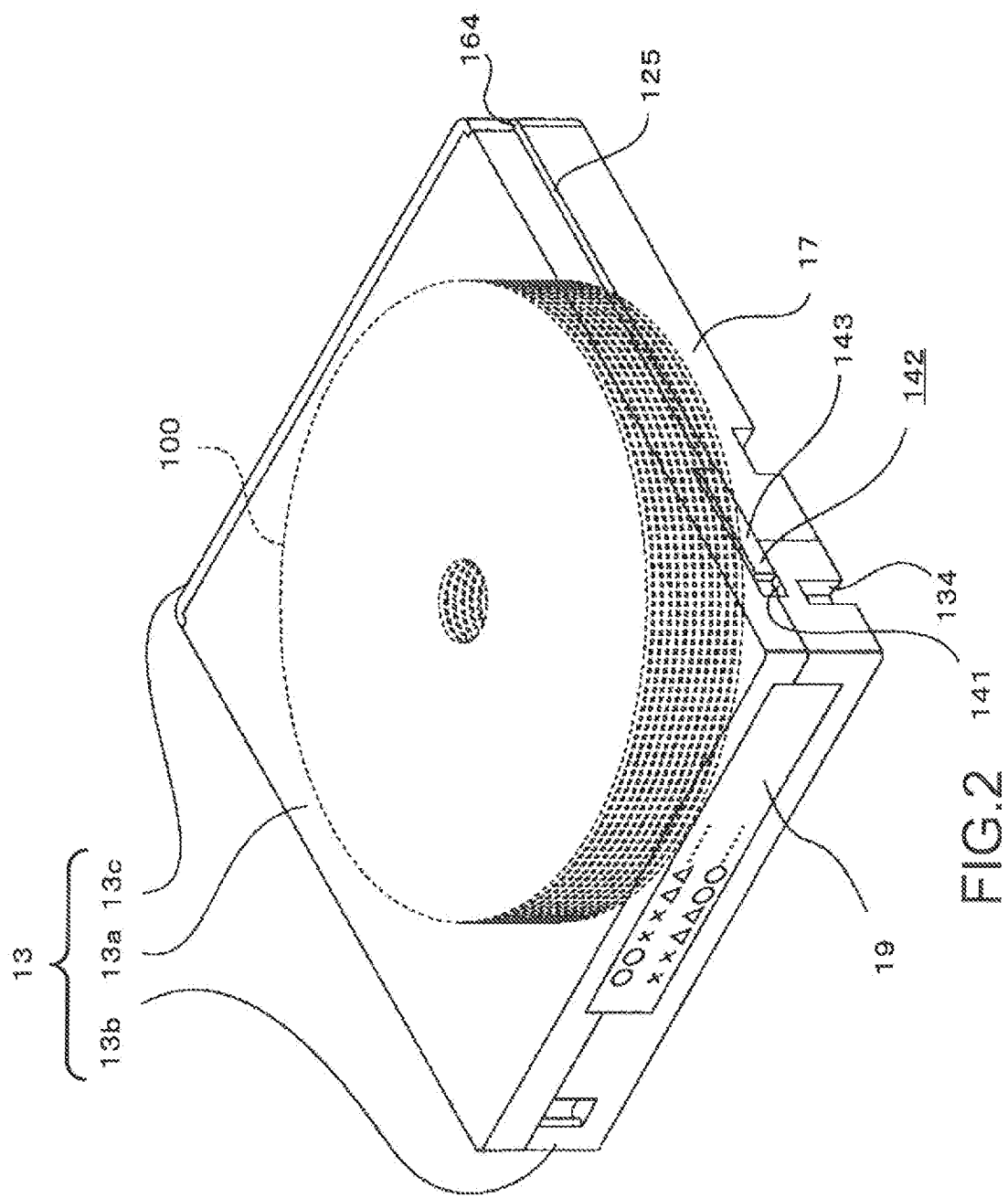
FIG. 2 is a perspective view of the cartridge.
Figure 3:
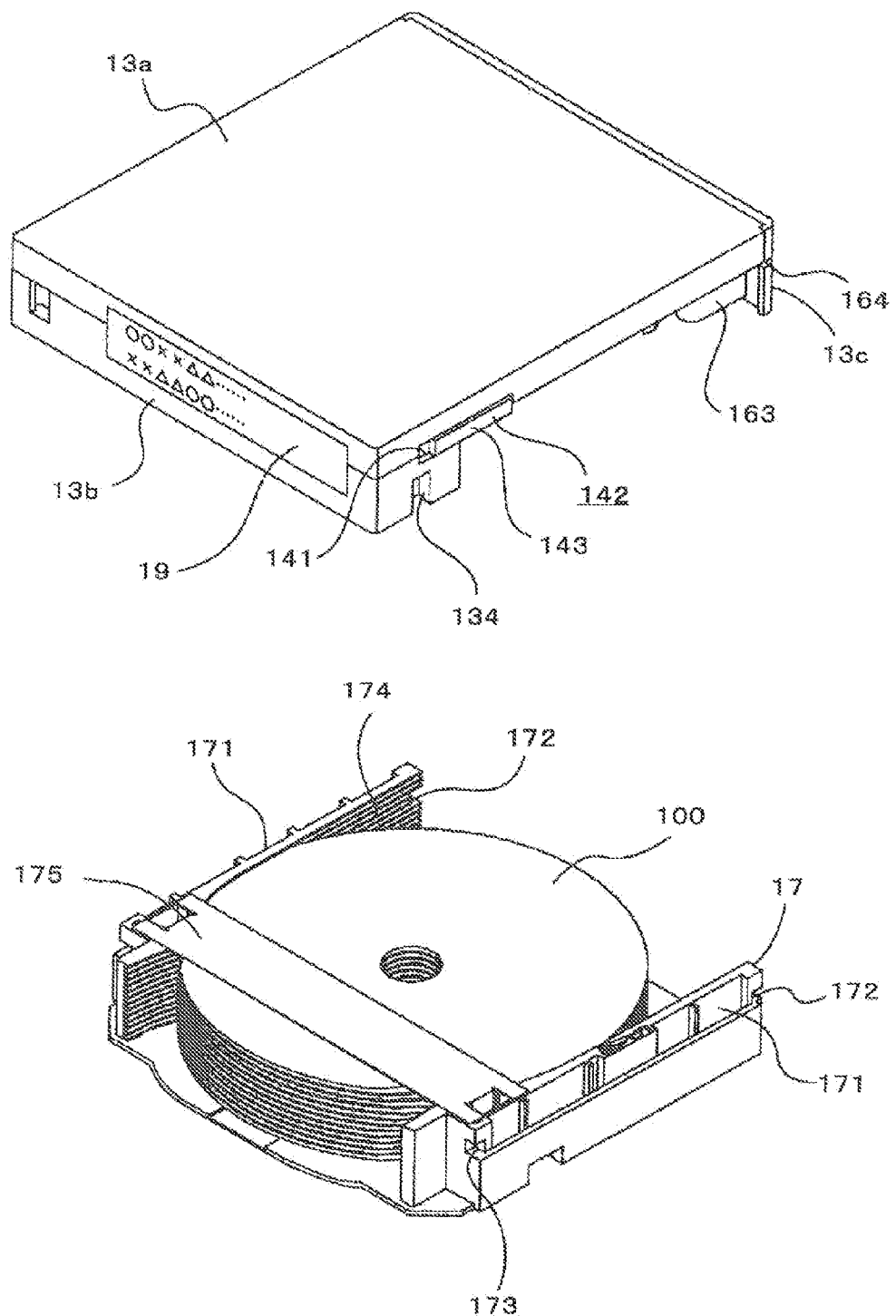
FIG. 3 is a perspective view showing a state in which a first shell and a second shell are separated from each other.

In a state in which the first shell 13 and the second shell 17 are coupled to each other, insertion grooves 125 are formed, between a lower surface of a side surface of the first shell 13 and an upper surface of a side surface of the second shell 17 (see FIG. 2). The insertion grooves 125 each extend in the front and rear directions. A front end of each of the insertion grooves 125 is continuous with each of the slider support portions 141 of the first shell 13. A rear end of each of the insertion grooves 125 is continuous with each of the insertion cutouts 164 formed in the back panel 13c.

In the thus configured cartridge 10, in the state in which the first shell 13 and the second shell 17 are coupled to each other, the first shell 13 and the second shell 17 are locked by the lock sliders 142 and the lock levers 151.

That is, the lock sliders 142 are positioned at rear moving ends by biasing forces of the biasing members 146. The lock portion 144 is inserted into and engaged to the second locking recesses 173 formed in side surface portions of the second shell 17. The lock levers 151 are positioned at rotational ends in directions (outward) in which leading end portions of the lock, portions 153 move away from each other by biasing forces of the biasing members 155. The locking protrusions 153a of the lock portions 153 are inserted into and engaged with the first locking recesses 172 formed in the side surface portions of the second shell 17.

Further, by releasing the lock by the lock sliders 142 and the lock levers 151, the first shell 13 and the second shell 17 are separated from each other. In this manner, the optical disc 100 within the cartridge can be removed. That is, in the cartridge 10, by lock release pieces 468 (see FIG. 9) provided to the cartridge drive apparatus moving the lock sliders 142 forwards, the lock portions 144 are detached from the second locking recesses 173 formed in the side surface portions of the second shell 17. In this manner, the engagement between the first shell 13 and the second shell 17 is released. Further, lock release pieces 522 (see FIG. 11) provided to the cartridge drive apparatus are inserted into the insertion holes 162 of the back panel 13c. In the cartridge 10, the insertion of the lock release pieces 522 presses the lock release portions 154 of the lock levers 151, to thereby rotate the lock portions 153 rotated by the biasing members 155 in opposite directions. Thus, the lock portion 153 is detached from the first locking recesses 172 formed in the side surface portions of the second shell 17. In this manner, the engagement between the first shell 13 and the second shell 17 is released.

<3. Configuration of Selection Loader in Cartridge Drive Apparatus>

Figure 7:
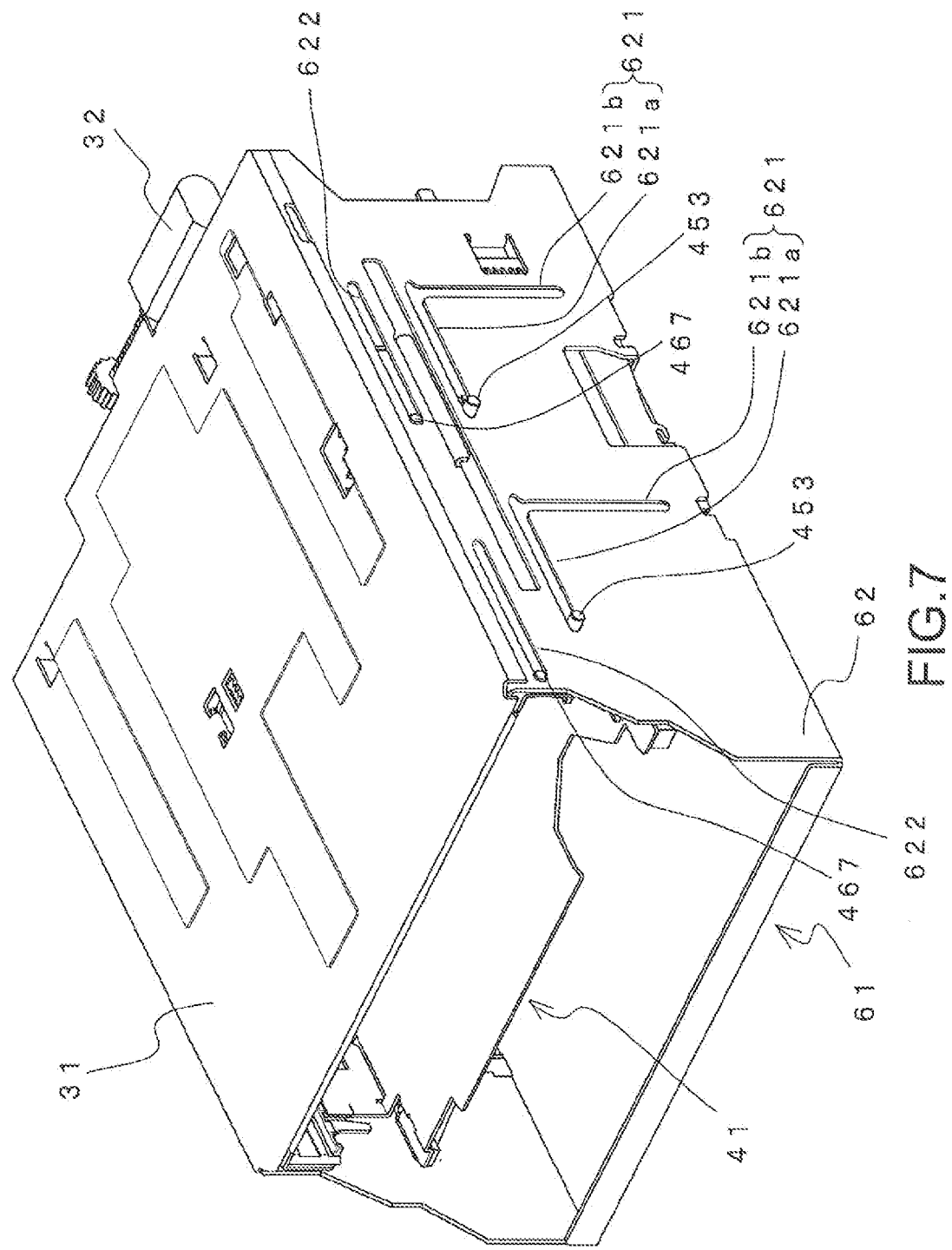
FIG. 7 is a perspective view showing a selection loader.

Next, a configuration of the selection loader 30 provided to the cartridge drive apparatus will be described. FIG. 7 is a perspective view showing the selection loader. The selection loader 30 includes a top chassis 31, a cartridge holder 41, and a loader base 61.

Cam holes 621 are formed in each of the side plate portions 62 of the loader base 61. The cam holes 621 are distant from each other in the front and rear directions. Each of the cam holes 621 consists of a linear portion 621a extending in the front and rear directions and a perpendicular portion 621b extending in a perpendicular direction. A rear end portion of the linear portion 621a is continuous with an upper end portion of the perpendicular portion 621b. Further, supported holes 622 are formed at positions distant from the cam holes 621 by a predetermined distance in the upper direction in each of the side plate portions 62 of the loader base 61. The supported holes 622 each extend in the front and rear directions. The supported holes 622 are distant from each other in the front and rear directions.

Slide pins 453 provided to the lower holder 45 of the cartridge holder 41, which will be described later, are inserted into the cam holes 621 from inner surface sides. The slide pins 453 are supported with respect to the loader base 61 to be movable in the front and rear directions. Further, slide pins 467 of an upper holder 46 of the cartridge holder 41, which will be described later, are inserted into the supported holes 622 from the inner surface sides. Therefore, the cartridge holder 41 is supported with respect to the loader base 61 to be movable in the front and rear directions. Further, the lower holder 45 is supported to be movable not only in the front and rear directions but also in the upper and lower directions.

Figure 8:
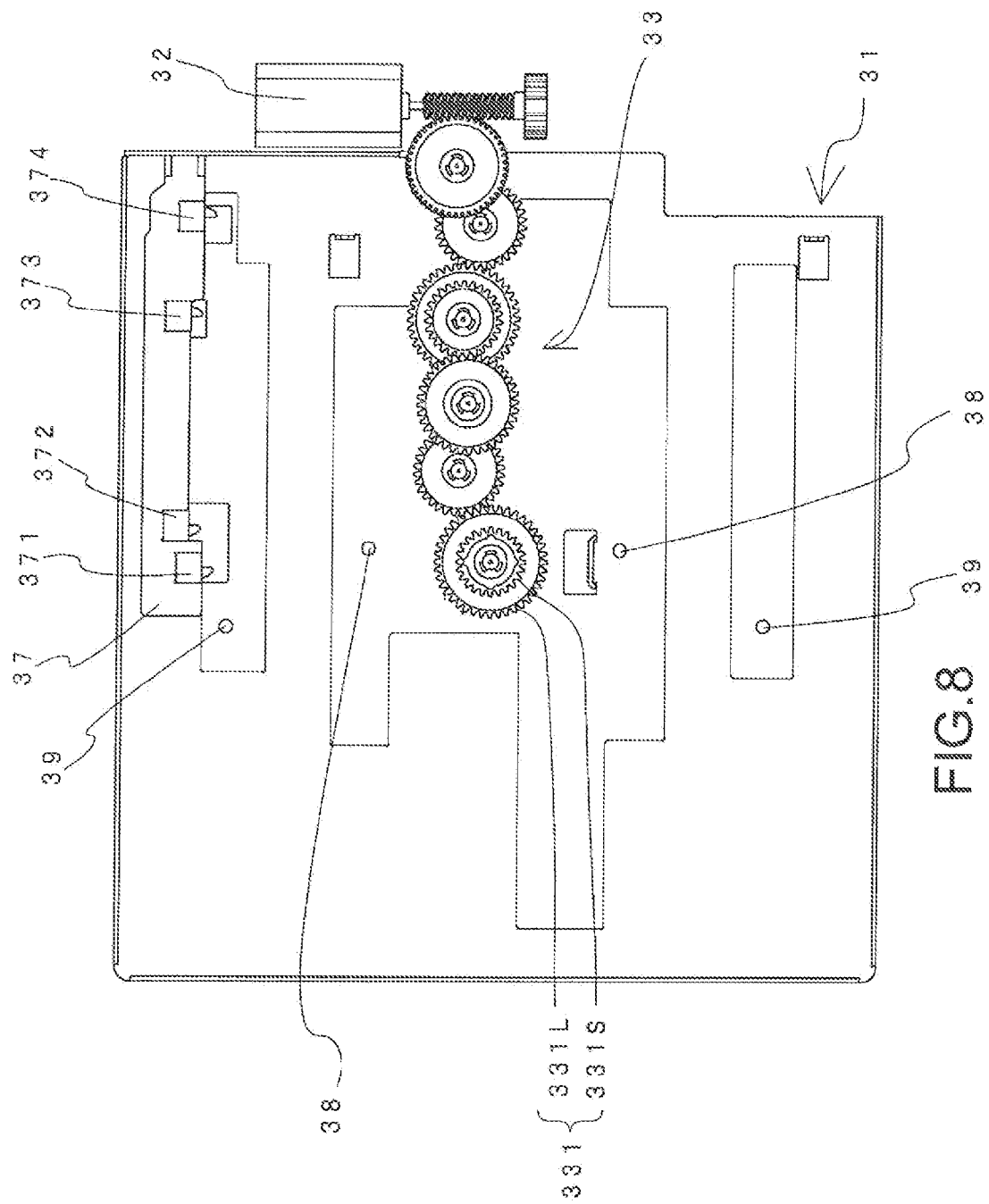
FIG. 8 is a view showing a configuration of a top chassis.

FIG. 8 shows a configuration of the top chassis. A driving motor 32 is attached on a rear end side of the top chassis 31. A reduction gear group 33 is provided on a disc holder surface side of the top chassis 31. A rack drive gear 331 of the reduction gear group 33 is a two-stage gear consisting of a large-diameter gear 331L and a small-diameter gear 331S. The small-diameter gear 331S of the rack drive gear 331 is meshed with a rack gear 465 provided to the upper holder 46 to be described later. The large-diameter gear 331L is meshed with a rack gear 514 provided to a lock plate 51. Therefore, a driving force of the driving motor 32 is transmitted to the rack drive gear 331 via the reduction gear group 33, such that the upper holder 46 and the lock plate 51 are moved in the insertion direction or a discharge direction of the cartridge 10.

Further, a sensor substrate 37 is attached to the top chassis 31. The sensor substrate 37 includes detection switches 371 to 374 for detecting the position of the cartridge holder 41 and the presence and absence of the cartridge 10. The sensor substrate 37 is attached at a position corresponding to the upper holder 46 and the lock plate 51 to be moved by the driving motor 32. In addition, a release shaft 38 and a reset shaft 39 are provided on the disc holder surface side of the top chassis 31. The release shaft 38 is a shaft for releasing a lock state in which the cartridge 10 is held with respect to the cartridge holder 41 in an undetachable manner. The reset shaft 39 is a shaft for returning a discharge control slider to be described later to an initial position.

Figure 9:
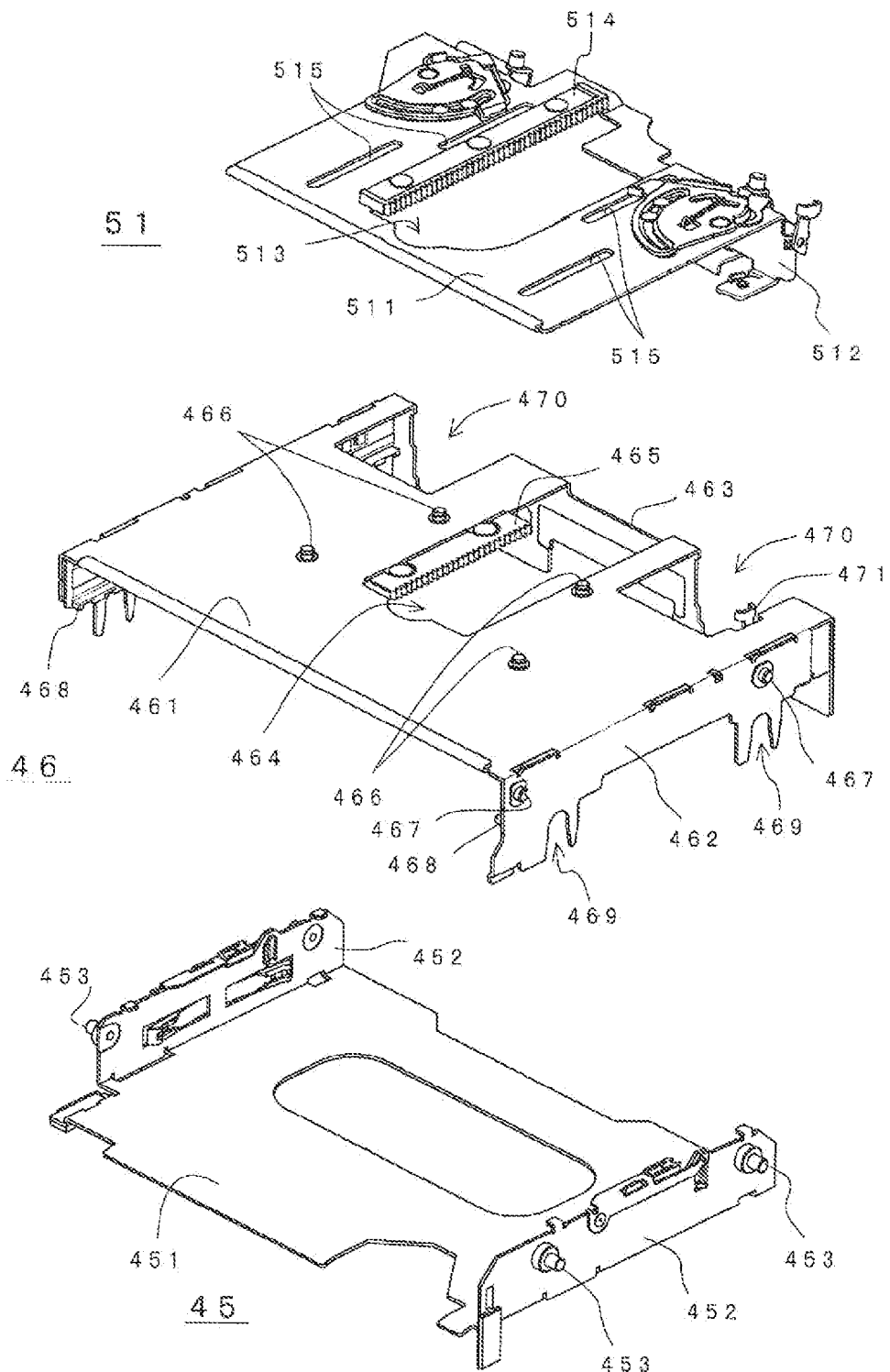
FIG. 9 is an exploded perspective view showing a configuration of a cartridge holder.

FIG. 9 is an exploded perspective view showing a configuration of the cartridge holder. The cartridge holder 41 is constituted of the lower holder 45 and the upper holder 46. Further, the lock plate 51 is attached to the upper holder 46 to be movable in the front and rear directions.

The lower holder 45 consists of a lower plate portion 451 and lateral plate portions 452. The lower plate portion 451 is oriented in the upper and lower directions. The lateral plate portions 452 are projected upward from both left and right edges of the lower plate portion 451. The slide pins 453 are provided in each of outer surfaces of the lateral plate portions 452. The slide pins 453 are laterally projected and distant from each other in the front and rear directions.

Regarding the lower holder 45, the slide pins 453 are inserted into the cam holes 621 formed in the side plate portions 62 of the loader base 61 from the inner surface sides of the side plate portions 62. In this manner, the slide pins 453 are supported with respect to the loader base 61 to be movable in the front and rear directions and the upper and lower directions.

The upper holder 46 consists of an upper surface portion 461, lateral surface portions 462, and a back surface portion 463. The upper surface portion 461 is oriented in the upper and lower directions. The lateral surface portions 462 are projected downward from the both left and right edges of the upper surface portion 461. The back surface portion 463 is projected downward from a rear edge of the upper surface portion 461.

An opening portion 464 corresponding to the position of the reduction gear group 33 of the top chassis 31 is formed on an upper surface side of the upper surface portion 461. The opening portion 464 extends in the front and rear directions. The rack gear 465 meshed with the small-diameter gear 331S of the rack drive gear 331 is provided at an end portion of the opening portion 464. The rack gear 465 extends in the front and rear directions, that is, the movement direction of the cartridge 10. Further, slide pins 466 are provided on the upper surface side of the upper surface portion 461. The slide pins 466 are distant from each other in the left- and right-hand directions and in the front and rear directions.

The slide pins 467 laterally projected are provided in each of outer surfaces of the lateral surface portions 462. The slide pins 467 are distant from each other in front and rear directions.

The slide pins 467 are inserted into the supported holes 622 formed in the side plate portions 62 of the loader base 61 from the inner surface sides of the side plate portions 62. The upper holder 46 is supported with respect to the loader base 61 to be movable in the front and rear directions.

The lock release pieces 468 for sliding the lock sliders 142 of the cartridge 10 are provided on inner-surface front-end sides of the lateral surface portions 462. Coupling grooves 469 opened downward are formed in each of lower end portions of the lateral surface portions 462. The coupling grooves 469 are distant from each other in the front and rear directions.

The slide pins 453 of the lower holder 45 are inserted into the coupling grooves 469 of the upper holder 46 from, below. Therefore, when the upper holder 46 is driven by the rack drive gear 331 in the state in which the slide pins 453 of the lower holder 45 are inserted into the coupling grooves 469 of the upper holder 46, the lower-holder 45 and the upper holder 46 are integrated with each other and move in the front, and rear directions. Further, when the slide pins 453 of the lower holder 45 slide in the cam holes 621 in the lower direction after the lower holder 45 and the upper holder 46 are integrated with each other and moved to a predetermined position, the lower holder 45 and the upper holder 46 are separated from each other. Then, only the lower holder 45 moves in the lower direction.

Opening portions 470 are provided at positions of the back surface portion 463 of the upper holder 46, the positions corresponding to a locking mechanism provided to the lock plate 51 for locking the cartridge and a pressing mechanism provided to the lock plate 51 for pressing the cartridge in the discharge direction. Further, an actuation piece 471 is formed in the back surface portion 463. The actuation piece 471 projects to a position of an operation lever for the detection switch.

The lock plate 51 consists of an upper surface portion 511 and a back surface portion 512. The upper surface portion 511 is oriented, in the upper and lower directions. The back surface portion 512 is projected downward from a rear edge of the upper surface portion 511.

An opening portion 513 is formed in the upper surface portion 511 of the lock plate 51. The opening portion 513 corresponds to the position of the reduction gear group 33 of the top chassis 31. The opening portion 513 extends in the front and rear directions. The rack gear 514 meshed with the large-diameter gear 331L of the rack drive gear 331 is provided at a side end portion of the opening portion 513. The rack gear 514 extends in the front and rear directions, that is, the movement direction of the cartridge 10.

Further, support holes 515 are formed at the positions of the slide pins 466 of the upper holder 46 in the upper surface portion 511. The support holes 515 each extend in the front, and rear directions. The slide pins 466 are inserted into the support holes 515 from a lower surface of the lock plate 51 and fixed with rings or the like such that the lock plate 51 is retained without falling down. Therefore, the lock plate 51 is retained to be slidable on an upper surface of the upper holder 46 in the front and rear directions.

Figure 10:
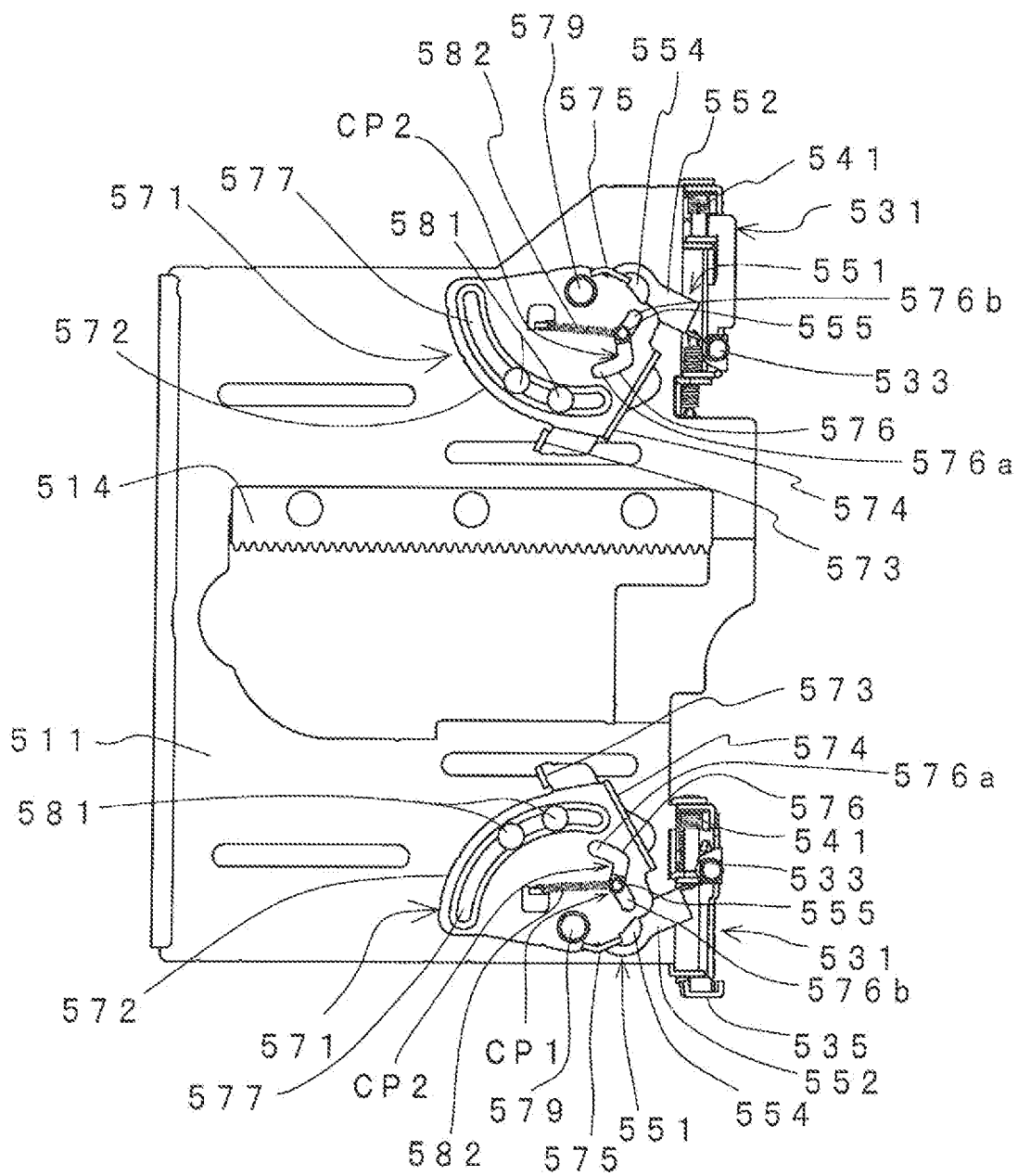
FIG. 10 is a plan view of a lock plate.
Figure 11:
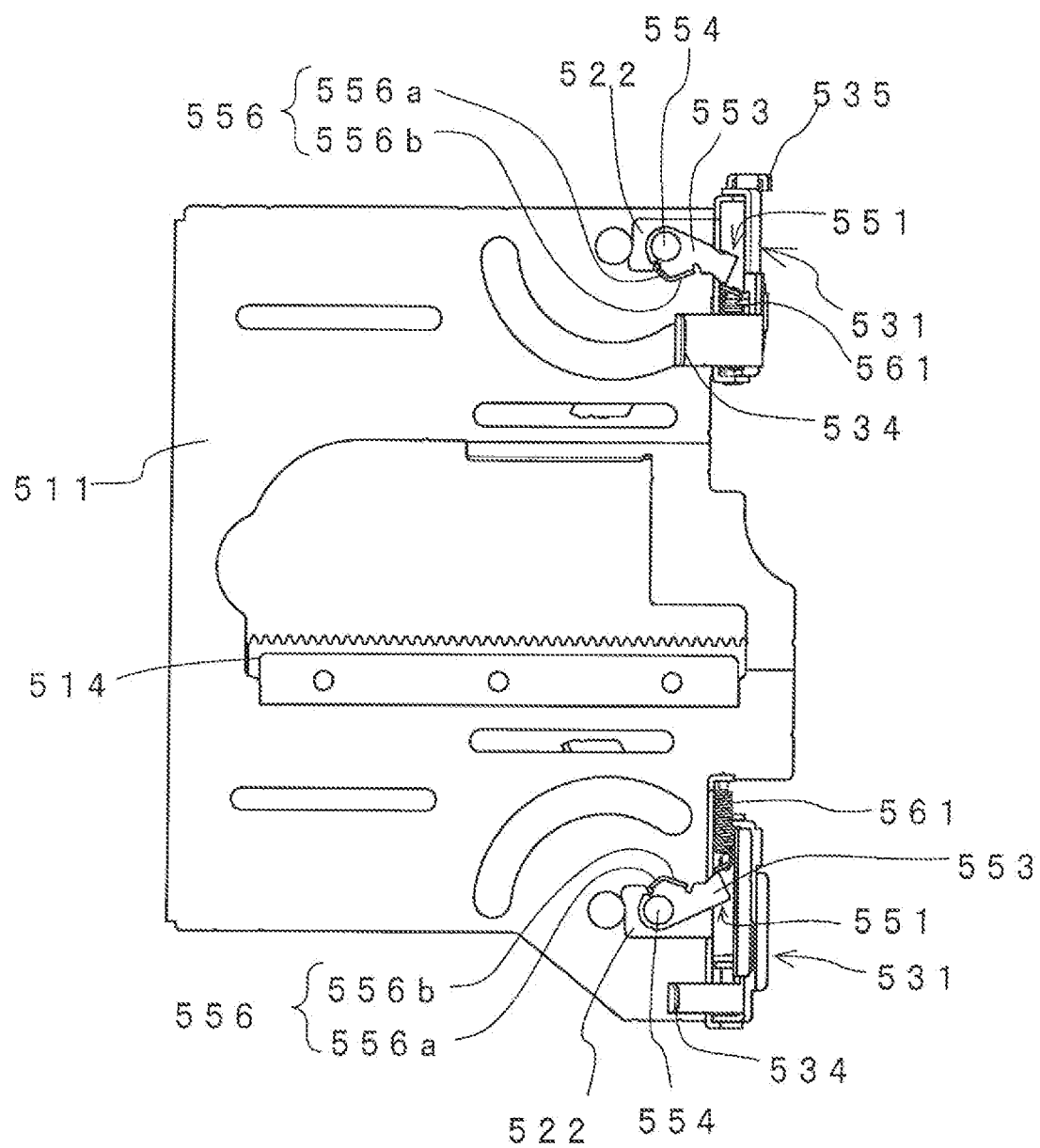
FIG. 11 is a bottom view of the lock plate.
Figure 12:
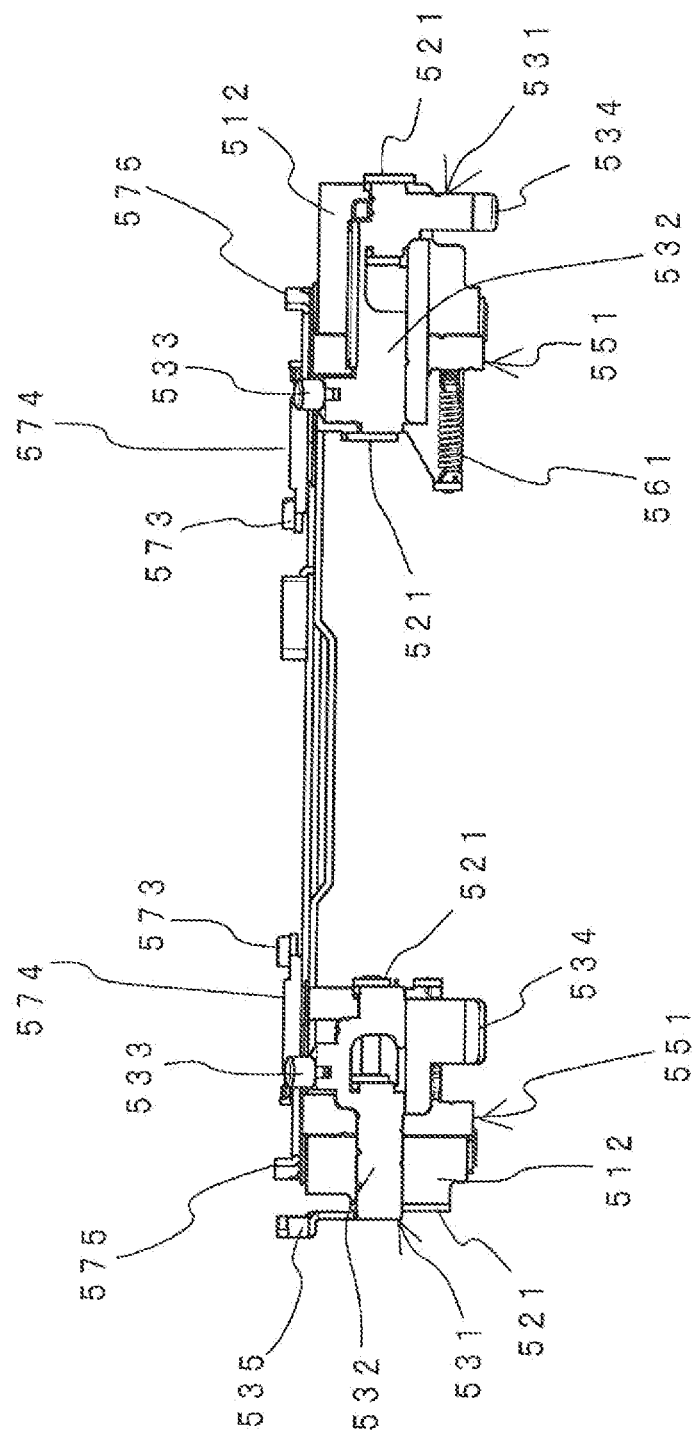
FIG. 12 is a rear view of the lock plate.
Figure 13:
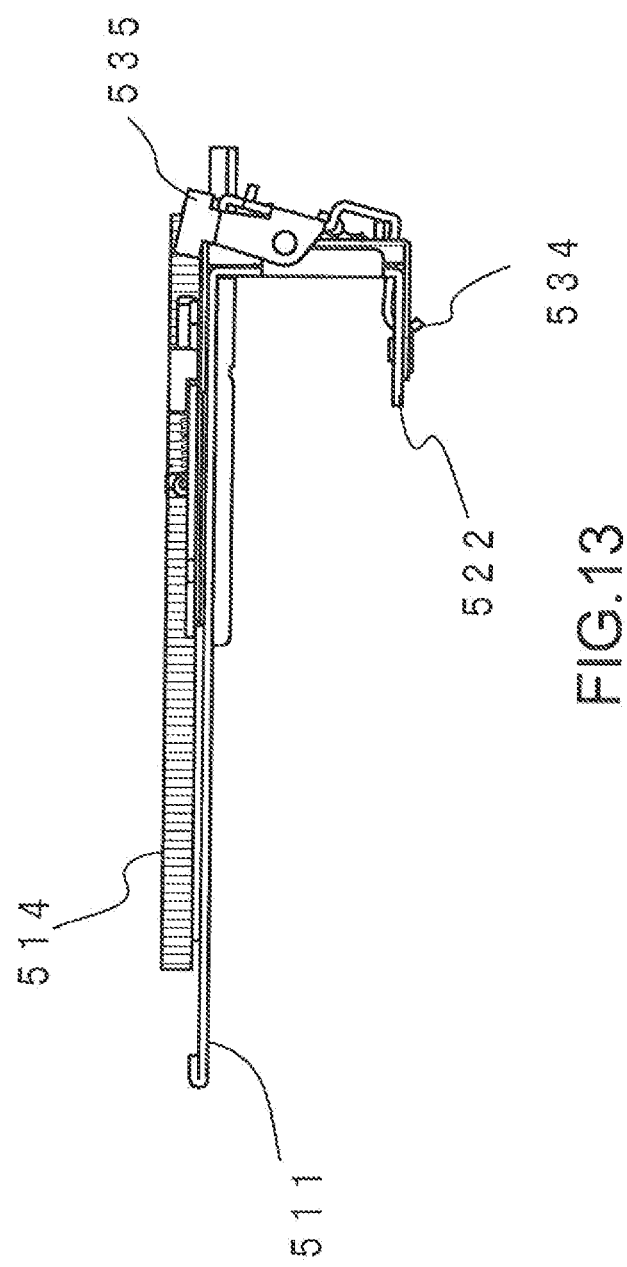
FIG. 13 is a side view of the lock plate.

FIG. 10 is a plan view of the lock plate. FIG. 11 is a bottom view of the lock plate. FIG. 12 is a rear view of the lock plate. FIG. 13 is a side view of the lock plate.

Lever retaining portions 521 are formed in the back surface portion 512 of the lock plate 51. The lever retaining portions 521 support discharge levers 531 to be rotatable. The discharge levers 531 serve as pressing mechanisms that press the cartridge in the discharge direction. The lever retaining portions 521 project in a back surface direction. Further, the lock release pieces 522 are formed in lower-side leading ends of the back surface portion 512. The lock release pieces 522 project in a front surface direction. When the cartridge 10 is inserted into the cartridge holder 41, the lock release pieces 522 are inserted into the insertion holes 162 provided to the back panel 13c of the cartridge 10. Then, the lock release pieces 522 rotate the lock levers 151. Therefore, the lock by the lock levers 151 in the cartridge 10 is released.

Each of the discharge levers 531 consists of a rotating surface portion 532, a slide protrusion 533, and a pressing portion 534. The rotating surface portion 532 is opposed to the back surface portion 512. The slide protrusion 533 is provided at an upper end of the rotating surface portion 532. The pressing portion 534 projects from a lower end of the rotating surface portion 532 in the front surface direction. Further, an actuation piece 535 is formed in the discharge lever 531 provided on a side of the sensor substrate 37. The actuation piece 535 projects to the position of the operation lever for the detection switch.

A rotation fulcrum is provided in a side surface of the rotating surface portion 532. The discharge lever 531 is biased by a biasing member 541, for example, a spring in such a direction that the pressing portion 534 moves in the front direction.

Further, shell locking levers 551 are provided in the back surface portion 512 of the lock plate 51. The shell locking levers 551 serve as a locking mechanism configured to lock the cartridge. Each of the shell locking levers 551 is provided to be rotatable with a perpendicular direction of the lock plate 51 with respect to the upper surface portion 511 being an axis. The shell locking lever 551 is formed in a horizontal u-shape. A rotational shaft 554 is provided to an upper surface portion 552 and a lower surface portion 553 of the shell locking lever 551.

The upper surface portion 552 is provided between the lock plate 51 and a discharge control slider 571 to be described later. A slide pin 555 is provided projecting towards the discharge control slider 571. The lower surface portion 553 is attached on a lower surface side of the lock release piece 522. A locking portion 556 is formed to project from a side end of the lock release piece 522 depending on a rotation of the shell locking lever 551. A tilting edge of the locking portion 556, which is positioned on the front side, is referred to as a first tilting edge 556a. A tilting edge of the locking portion 556, which is positioned on the rear side, is referred to as a second tilting edge 556b. Further, the shell locking lever 551 is biased by a biasing member 561, for example, a coil spring in such a direction that the locking portion 556 projects from the side end of the lock release piece 522.

The discharge control slider 571 is provided in the upper surface portion 511 of the lock plate 51. The discharge control slider 571 serves as a discharge control mechanism. The discharge control slider 571 includes a base body 572. An engage portion 573, slide surface portions 574 and 575, a cam hole 576, and a support hole 577 are formed in the base body 572.

The engage portion 573 is formed at a side end of the base body 572. When the lock plate 51 moves in the discharge direction from the cartridge insertion completion position, the engage portion 573 abuts against the release shaft 38. Then, the engage portion 573 rotates the discharge control slider 571 about a rotational shaft 579.

The slide surface portion 574 is formed at a rear end of the base body 572. When the engage portion 573 abuts against the release shaft 38 and the discharge control slider 571 is rotated, the slide surface portion 574 slides together with the slide protrusion 533. The slide surface portion 574 moves the slide protrusion 533 downward.

The slide surface portion 575 is formed at a side end in opposite to the side end at which the engage portion 573 is formed. When the lock plate 51 further moves in the discharge direction, the reset shaft 39 slides. The slide surface portion 575 rotates the discharge control slider 571 in an opposite direction to the direction of rotation of the slide surface portion 575 by the engage portion 573.

The slide pin 555 provided in the upper surface portion 552 of the shell locking lever 551 is inserted into the cam hole 576 of the discharge control slider 571.

The cam hole 576 is formed to rotate the shell locking lever 551 in an opposite direction to a biasing direction in such a manner that the slide pin 555 moves from a first cam position CP1 to a second cam position CP2 along the cam hole 576. When the shell locking lever 551 is rotated in the opposite direction to the biasing direction, the locking portion 556 moves in an inner surface direction from the side end of the lock release piece 522. Further, regarding the cam hole 576, a cam hole 576 is formed to keep a position of the rotated shell locking lever 551 when the slide pin 555 moves beyond the second cam position CP2 along the cam hole 576. That is, the cam hole 576 is formed to extend in a peripheral direction with the rotational shaft 579 being a center.

The support hole 577 is formed to extend in the peripheral direction with the rotational shaft 579 being the center. Slide pins 581 provided in the upper surface portion 511 of the lock plate 51 are inserted into the support hole 577. Accordingly, the discharge control slider 571 is retained to be rotatable with the rotational shaft 579 being the center.

The discharge control slider 571 is biased by a biasing member 582, for example, a coil spring to be retained at the first cam position CP1 before the slide pin 555 moves from the first cam position CP1 to the second cam position CP2 and after the slide pin 555 moves from the second cam position CP2 to the first cam position CP1.

<4. Insertion and Discharge Operations of Cartridge>

Next, an insertion operation of the cartridge of the cartridge drive apparatus 20 will be described.

Figure 14:
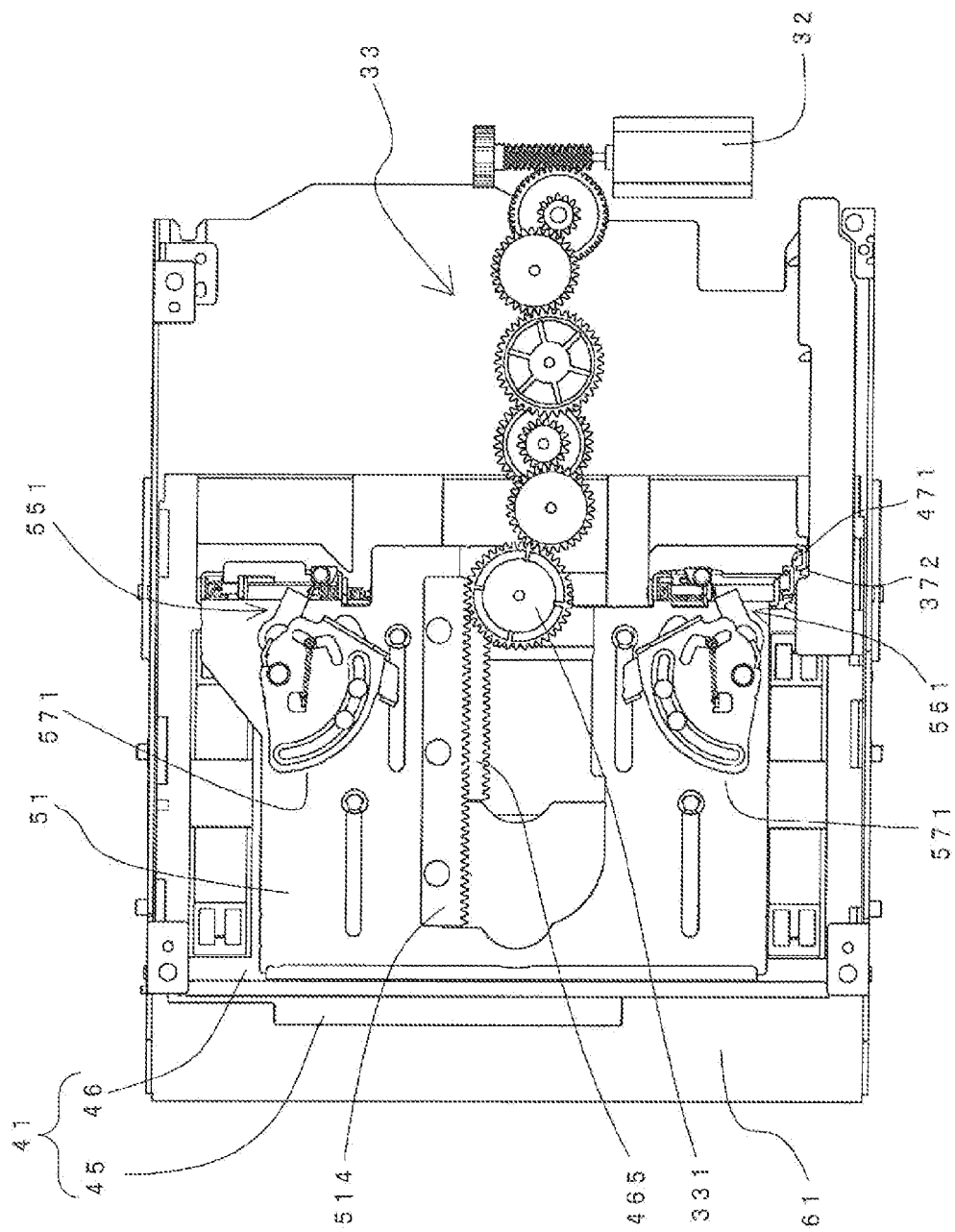
FIG. 14 is a view showing a state of the selection loader upon insertion of the cartridge.

FIG. 14 shows a state of the selection loader 30 upon insertion of the cartridge. Upon insertion of the cartridge, the upper holder 46 and the lock plate 51 are driven to a position of the front end by the driving motor 32 and the reduction gear group 33. Note that whether or not the upper holder 46 and the lock plate 51 are driven to the position of the front end can be detected based on the fact that the actuation piece 471 provided to the back surface portion 463 of the upper holder 46 abuts against the lever of the detection switch 372 provided to the sensor substrate 37 and a switch operation is performed.

Upon insertion of the cartridge, regarding the discharge control slider 571, the slide pin 555 is located at the first cam position CP1. Regarding the shell locking levers 551, the locking portion 556 projects from the side end of the lock release piece 522 due to a biasing force of the biasing member. Further, regarding the discharge levers 531, the pressing portions 534 are biased by the biasing members and moves forwards.

In such a state, when the cartridge 10 is inserted into the cartridge holder 41, the lock release pieces 522 formed in the back surface portion 512 of the lock plate 51 are inserted into the insertion holes 162 provided to the back panel 13c of the cartridge 10. Therefore, the lock of the cartridge 10 by the lock levers 151 is released. Further, when the lock release pieces 522 are inserted into the insertion holes 162, the end portions of the insertion holes 162 slide on the first tilting edge 556a of the locking portion 556 in the shell locking levers 551. Thus, the shell locking levers 551 are rotated in opposite directions to directions of biasing forces. After that, when the end portions of the insertion holes 162 pass through the first tilting edges 556a and are located at positions of the second, tilting edges 556b, the shell locking levers 551 are rotated in the directions of the biasing forces. In this manner, when the locking portions 556 are inserted into the insertion holes 162, the locking portions 556 are hooked into the insertion holes 162. Therefore, the back panel 13c is sandwiched by the locking portions 556 of the left and right shell locking levers 551 and the cartridge 10 is locked to the lock plate 51.

Figure 15:
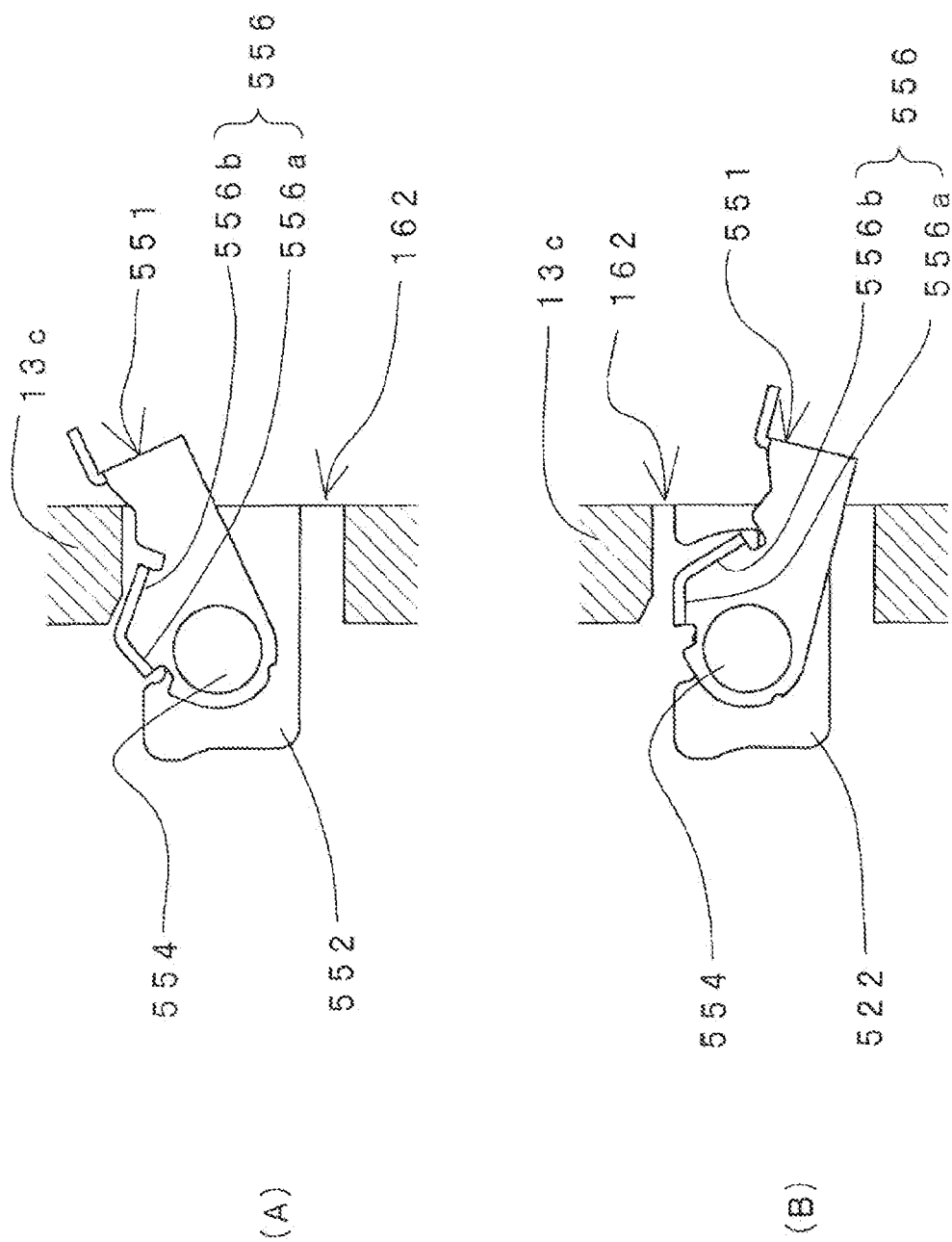
FIG. 15 is a view for explaining a state in which the cartridge is locked to the lock plate and a state in which the lock is released.

FIG. 15 is a view for explaining a state in which the cartridge 10 is locked to the lock plate 51 and a state in which the lock is released. Picture (A) of FIG. 15 shows a lock state, that is, a state in which the locking portion 556 is inserted into the insertion hole 162 and the locking portion 556 is locked in the insertion hole 162. On the other hand, Picture (B) of FIG. 15 shows a lock-released state, that is, a state in which the lock of the back panel 13c is released in such a manner that the shell locking lever 551 is rotated in an opposite direction to a biasing force and the locking portion 556 moves in an inside direction from a side end of the lock release piece 522.

Figure 16:
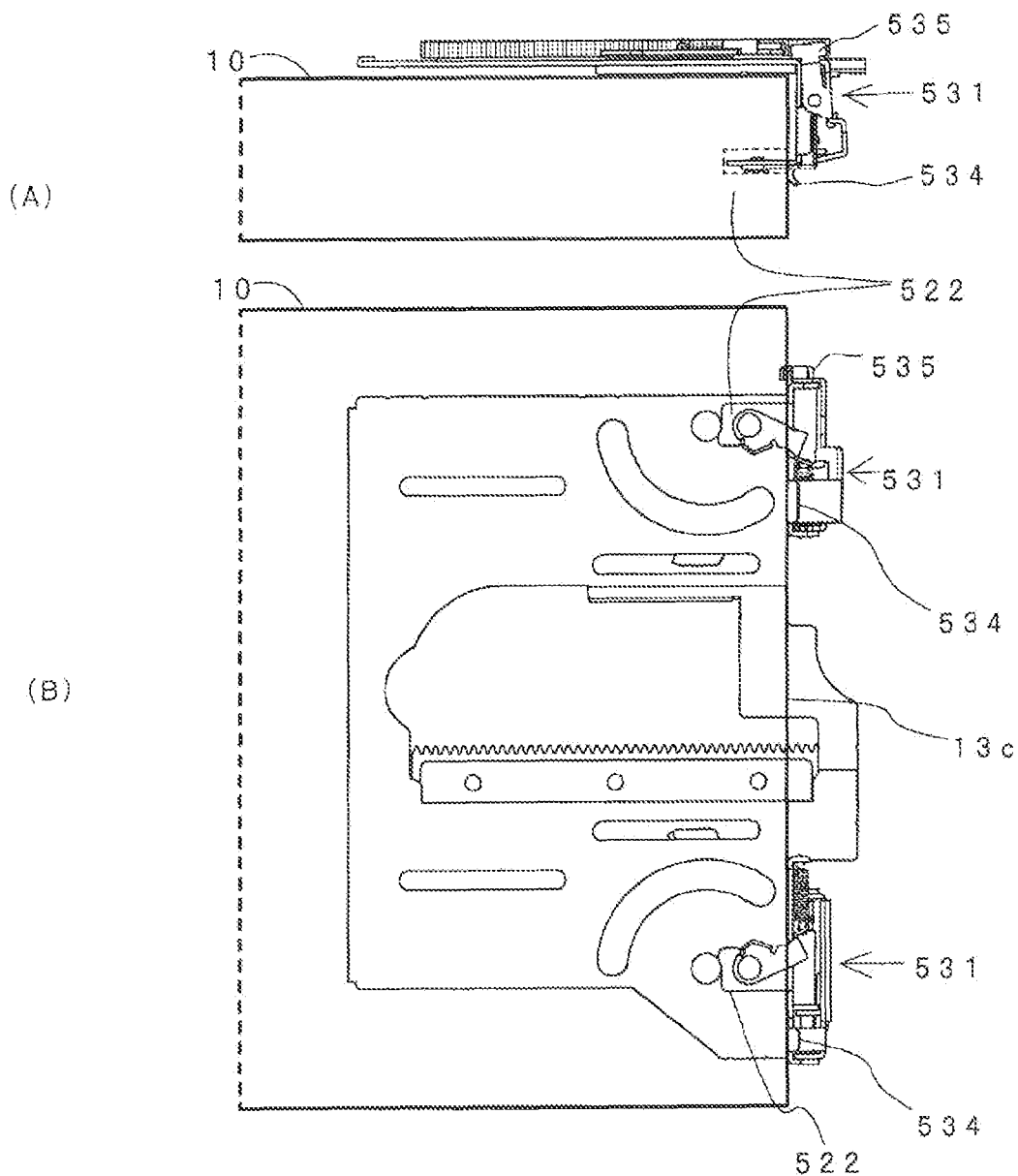
FIG. 16 is a view showing a state in which the cartridge is inserted into the cartridge holder.

FIG. 16 shows a state in which the cartridge 10 is inserted into the cartridge holder 41. When the cartridge 10 is inserted into the cartridge holder 41, the back panel 13c of the cartridge 10 abuts against the pressing portion 534 of the discharge lever 531, and the discharge lever 531 is rotated in the opposite direction to a biasing force direction. Further, by the discharge lever 531 being rotated in the opposite direction to the biasing force direction, the actuation piece 535 of the discharge lever 531 is rotated in the front direction. The lever of the detection switch 371 of the sensor substrate 37 is operated. Therefore, the cartridge drive apparatus 20 is capable of judging, based on a signal from the detection switch 371, that the cartridge 10 is inserted. If the cartridge drive apparatus 20 judges that the cartridge 10 is inserted, the cartridge drive apparatus 20 causes the driving motor 32 and the reduction gear group 33 to move the upper holder 46 and the lock plate 51 rearwards and inserts the cartridge 10 into the apparatus.

Here, the lock plate 51 is slidable in the front and rear directions with respect to the upper holder 46, and the rack gear 465 of the upper holder 46 is driven by the small-diameter gear 331S of the rack drive gear 331. Further, the rack gear 514 of the lock plate 51 is each driven by the large-diameter gear 331L of the rack drive gear 331.

In the state in which the back panel 13c of the cartridge 10 is locked to the lock plate 51, when the lock plate 51 moves rearward with respect to the upper holder 46, the lock release pieces 468 provided to the lateral surface portions 462 of the upper holder 46 slides the lock sliders 142 of the cartridge 10 forwards. Therefore, the first shell 13 and the second shell 17 of the cartridge 10 becomes separable.

Figure 17:
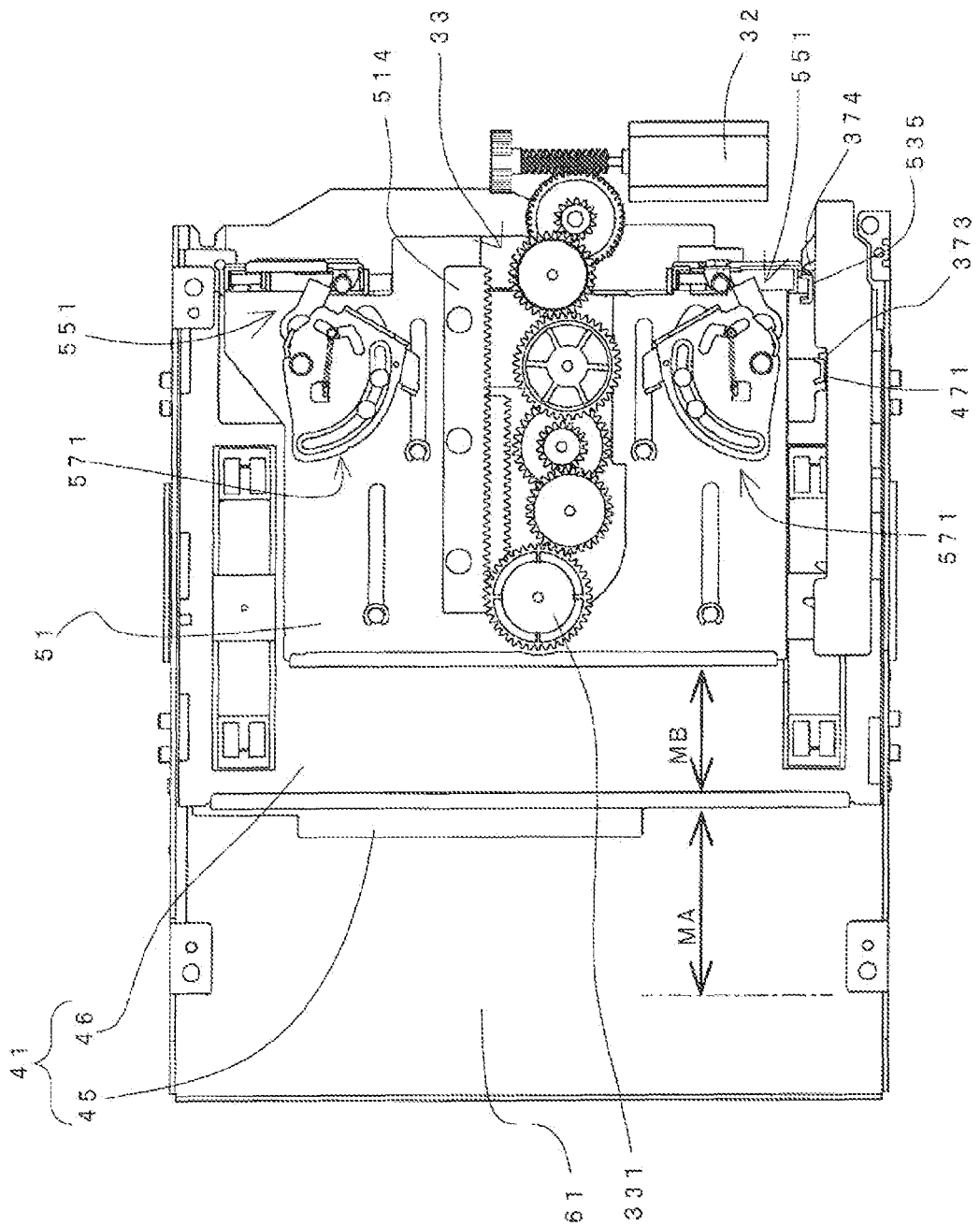
FIG. 17 is a view showing a state of the selection loader upon insertion completion of the cartridge.

FIG. 17 shows a state of the selection loader 30 upon insertion completion of the cartridge. When the upper holder 46 moves rearwards, the actuation piece 471 provided in the rear surface portion 463 of the upper holder 46 abuts against the lever of the detection switch 373 provided to the sensor substrate 37. The switch operation is performed. Based on the switch scan of the detection switch 373, the cartridge drive apparatus 20 stops driving the upper holder 46 and the lock plate 51 by the driving motor 32 and the reduction gear group 33.

Note that, in the state in which the cartridge 10 is not inserted into the cartridge holder 41, the discharge levers 531 are biased by the biasing members and the position of the actuation piece 535 is located more rearward than the position of the actuation piece 535 upon insertion of the cartridge 10. Therefore, when the lock plate 51 is located at the insertion completion position of the cartridge in the state in which the cartridge 10 is inserted into the cartridge holder 41, the actuation piece 535 abuts against the lever of the detection switch 374 provided to the sensor substrate 37, and the switch operation is performed. Therefore, according to a detection signal from the detection switch 374, it is possible to determine whether or not the cartridge 10 is inserted into the cartridge holder 41.

Next, a discharge operation of the cartridge 10 will be described with reference to FIG. 18. Note that FIG. 18 shows operations of the discharge control slider 571 and the like along with the movement of the lock plate 51 with the positions of the release shaft 38 and the reset shaft 39 provided to the top chassis 31 being references.

Figure 18:
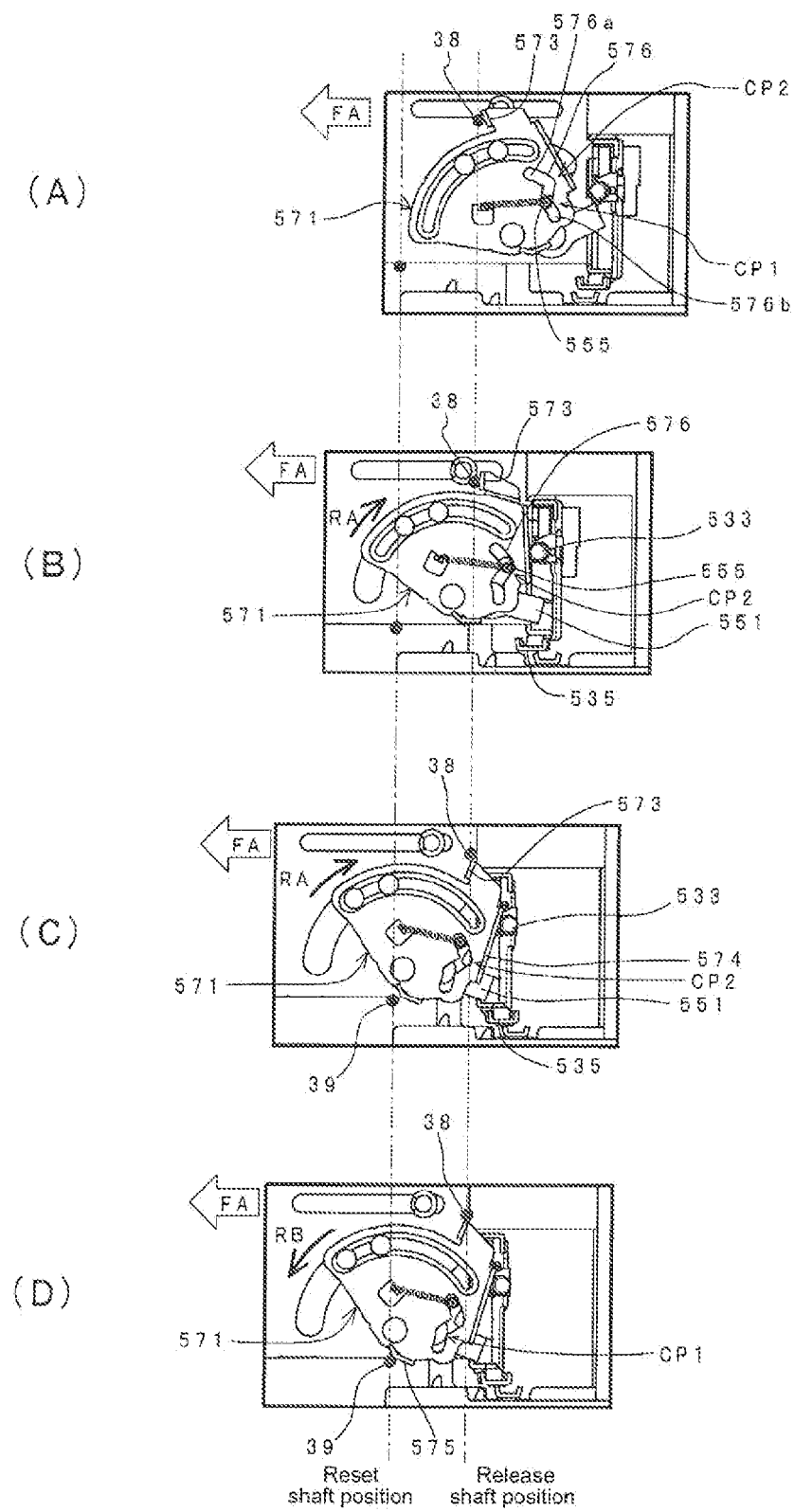
FIG. 18 is a view for explaining a discharge operation of the cartridge.

When the discharge of the cartridge 10 is started and the lock plate 51 moves forward (in arrow FA-direction), as shown in Picture (A) of FIG. 18, the release shaft 38 abuts against the engage portion 573 of the discharge control slider 571.

When the lock plate 51 further moves forwards, as shown in Picture (B) of FIG. 18, the discharge control slider 571 rotates in the arrow RA-direction and moves from the first cam position CP1 shown in Picture (A) of FIG. 18 to the second cam position CP2. At this time, the slide pin 555 provided to the upper surface portion 552 of the shell locking lever 551 is rotated in an opposite direction to a biasing force direction of the biasing member 561. When the slide pin 555 is rotated in an opposite direction to a biasing force direction of the biasing member 561, as shown in Picture (B) of FIG. 15, a lock state between the locking portion 556 inserted into the insertion hole 162 provided to the back panel 13c of the cartridge 10 and the insertion hole 162 is released. Therefore, the cartridge 10 becomes detachable from the lock plate 51.

When the lock plate 51 further moves forwards, as shown in Picture (C) of FIG. 18, the discharge control slider 571 is further rotated and moves to a position beyond the second cam position CP2 shown in Picture (B) of FIG. 18. When the discharge control slider 571 moves beyond the second cam position CP2, along with the movement, the slide protrusion 533 of the discharge lever 531 slides in the slide surface portion 574 of the discharge control slider 571. The discharge lever 531 rotates such that the pressing portion 534 moves forwards. That is, the cartridge 10 is pushed out by moving the pressing portion 534 forwards, and the lock release piece 522 is pulled out from the insertion hole 162 provided to the back panel 13c of the cartridge 10. Therefore, in the cartridge 10, a lock by the lock lever 151 is performed. Further, the discharge control slider 571 moves beyond the second cam position CP2, and hence the engage portion 573 is detached from the release shaft 38.

When the lock plate 51 further moves forwards, as shown in Picture (D) of FIG. 18, the slide surface portion 575 of the discharge control slider 571 abuts against the reset shaft 39. In addition, when the lock plate 51 moves forwards, the discharge control slider 571 is rotated in the arrow RB-direction by the slide surface portion 575 sliding on the reset shaft 39, and the cam position returns to the first cam position CP1 due to the biasing member 582. Further, by the discharge control slider 571 being returned to the first cam position CP1, the slide surface portion 575 is detached from the reset shaft 39. After that, by the lock plate 51 being pushed out forwards with respect to the upper holder 46, the cartridge 10 is also pushed out forwards from the upper holder 46.

Further, discharge of the cartridge 10 is started and the cartridge 10 is pushed out forwards, and hence the lock release piece 468 provided to the lateral surface portion 462 of the upper holder 46 moves so as to be separated from the lock slider 142 of the cartridge 10. Therefore, the first shell 13 and the second shell 17 of the cartridge 10 are retained in a coupling state.

Note that, upon an insertion operation of the cartridge 10, the discharge control slider 571 is not located at a position at which the reset shaft 39 abuts against the slide surface portion 575. Further, when the engage portion 573 of the discharge control slider 571 abuts against the release shaft 38, the discharge control slider 571 rotates in the arrow RB-direction. At this time, the slide pin 555 provided in the upper surface portion 552 of the shell locking lever 551 retracts to a cam hole 576b. The cam hole 576b is formed in a peripheral direction with the rotational shaft 579 being a center. Therefore, the slide pin 555 is not rotated. After that, the engage portion 573 is detached from the release shaft 38, and the cam portion is returned by the biasing member 582 to the first cam position CP1.

As described above, regarding the selection loader 30, a multi-stage slide mechanism is constituted of the upper holder 46 and the lock plate 51. Insertion of the cartridge is performed by moving the upper holder 46 in the rear direction and moving the lock plate 51 with respect to the upper holder 46 in the rear direction. Discharge of the cartridge is performed by moving the upper holder 46 in the front direction and moving the lock plate 51 with respect to the upper holder 46 in the front direction. Therefore, even if the cartridge drive apparatus is reduced in size, it is possible to ensure a sufficient loading amount. For example, as shown, in FIG. 17, the cartridge 10 moves by an amount of movement obtained by adding an amount of movement MA of the upper holder 46 and an amount of movement MB of the lock plate 51 attached to the upper holder 46. Therefore, in comparison with a case where the multi-step slide mechanism is not used, a sufficient loading amount can be ensured.

In addition, in the selection loader 30, upon insertion of the cartridge, the cartridge 10 is locked to the lock plate 51, and hence an insertion operation of the cartridge 10 can be reliably and stably performed. Further, upon discharge of the cartridge, detachment of the cartridge 10 from the lock plate 51 and coupling of the first shell 13 and the second shell 17 are automatically performed. Therefore, it is possible to reliably and stably perform a discharge operation of the cartridge.

When the cartridge 10 is detached from the lock plate 51, the shell locking lever 551 inserted into the insertion hole 162 provided to the back panel 13c of the cartridge 10 is rotated, and the lock between the locking portion 556 and the back panel 13c is released. In addition, the cartridge 10 is pushed out by the discharge lever 531 in the discharge direction such that the lock release piece 522 is pulled out from the insertion hole 162. Therefore, the detachment of the cartridge 10 from the lock plate 51 can be more reliably performed.

Note that the present disclosure should not be understood as being limited to the above-mentioned embodiments of the present disclosure. The embodiments of the present disclosure are merely examples, and it is clear that those skilled in the art can modify or substitute the embodiments without departing from the gist of the present, disclosure. That is, in order to determine the gist of the present disclosure, the scope of claims should be considered.

It should be noted that the cartridge drive apparatus according to the present disclosure may also take the following configurations.

(1) A cartridge drive apparatus, including:
a holder configured to hold a cartridge inserted therein;
a lock plate that is attached with respect to the holder to be movable in one of an insertion direction and a discharge direction of the cartridge and includes a locking mechanism configured to lock the cartridge; and
a drive unit configured to drive the holder and the lock, plate in one of the insertion direction and the discharge direction of the cartridge.

(2) The cartridge drive apparatus according to item (1), in which
the drive unit is configured to use a first gear and a second gear having a larger diameter than a diameter of the first gear to drive the holder through the first gear and the lock plate through the second gear.

(3) The cartridge drive apparatus according to Item (1) or (2), in which
the lock plate is provided with a discharge control mechanism configured to set, upon discharge of the inserted cartridge, the locking mechanism to be in a lock-released state in cooperation with a cartridge discharge operation.

(4) The cartridge drive apparatus according to Item (3), in which
the lock plate is provided with a pressing mechanism configured to press the cartridge in the discharge direction, and
the discharge control mechanism is configured to press, after setting to the lock-released state, the cartridge through the pressing mechanism in the discharge direction.

(5) The cartridge drive apparatus according to Item (3) or (4), in which
the lock plate is moved in the discharge direction of the cartridge in a state in which the discharge control mechanism abuts against a release shaft,
the locking mechanism is set to be in the lock-released state,
the lock plate is further moved in the discharge direction of the cartridge, and
the cartridge is pressed by the pressing mechanism in the discharge direction.

(6) The cartridge drive apparatus according to any one of Items (3) to (5), in which
the lock plate is moved in the discharge direction of the cartridge,
the discharge control mechanism is slid on a reset shaft after the discharge control mechanism is released from the abutting state against the release shaft, and
the discharge control mechanism is restored to an initial position.

In the cartridge drive apparatus according to the embodiment of the present disclosure, the holder configured to hold the cartridge inserted therein, the lock plate that is attached with respect to the holder to be movable in one of the insertion direction and the discharge direction of the cartridge and includes the locking mechanism configured to lock the cartridge, and the drive unit configured to drive the holder and the lock plate in one of the insertion direction and the discharge direction of the cartridge are provided. Therefore, it becomes possible to move the cartridge by the amount of movement of the lock plate in addition to the amount of movement of the holder. Further, the lock plate includes the locking mechanism configured to lock the cartridge. Therefore, it becomes possible to reduce the size and reliably perform the loading operation of the cartridge. Therefore, the embodiment of the present disclosure is suitable for an apparatus that uses the cartridge in which recording media are housed to perform recording/reproduction or the like.

It should be understood by those skilled, in the art that various modifications, combinations, sub-combinations and alterations may occur depending on design requirements and other factors insofar as they are within the scope of the appended claims or the equivalents thereof.

What is claimed is:

1. A cartridge drive apparatus, comprising:
a holder configured to hold a cartridge inserted therein;
a lock plate that is attached with respect to the holder to be movable in one of an insertion direction and a discharge direction of the cartridge and includes a locking mechanism configured to lock the cartridge; and
a drive unit configured to drive the holder and the lock plate in one of the insertion direction and the discharge direction of the cartridge, wherein the drive unit is configured to use a first gear and a second gear having a larger diameter than a diameter of the first gear to drive the holder through the first gear and the lock plate through the second gear.

2. The cartridge drive apparatus according to claim 1, wherein the lock plate is provided with a discharge control mechanism configured to set, upon discharge of the inserted cartridge, the locking mechanism to be in a lock-released state in cooperation with a cartridge discharge operation.

3. The cartridge drive apparatus according to claim 2, wherein the lock plate is further provided with a pressing mechanism configured to press the cartridge in the discharge direction, and the discharge control mechanism is configured to press, after setting to the lock-released state, the cartridge through the pressing mechanism in the discharge direction.

4. The cartridge drive apparatus according to claim 3, wherein
the lock plate is moved in the discharge direction of the cartridge in a state in which the discharge control mechanism abuts against a release shaft,
the locking mechanism is set to be in the lock-released state,
the lock plate is further moved in the discharge direction of the cartridge, and
the cartridge is pressed by the pressing mechanism in the discharge direction.

5. The cartridge drive apparatus according to claim 4, wherein
the lock plate is moved in the discharge direction of the cartridge,
the discharge control mechanism is slid on a reset shaft after the discharge control mechanism is released from the abutting state against the release shaft, and
the discharge control mechanism is restored to an initial position.

6. A cartridge drive apparatus comprising:
a holder configured to hold a cartridge inserted therein;
a lock plate that is attached with respect to the holder to be movable in one of an insertion direction and a discharge direction of the cartridge and includes a locking mechanism configured to lock the cartridge, wherein the lock plate is provided with a discharge control mechanism configured to set, upon discharge of the inserted cartridge, the locking mechanism to be in a lock-released state in cooperation with a cartridge discharge operation; and
a drive unit configured to drive the holder and the lock plate in one of the insertion direction and the discharge direction of the cartridge.

7. The cartridge drive apparatus according to claim 6, wherein the lock plate is further provided with a pressing mechanism configured to press the cartridge in the discharge direction, and the discharge control mechanism is configured to press, after setting to the lock-released state, the cartridge through the pressing mechanism in the discharge direction.

8. The cartridge drive apparatus according to claim 7, wherein
the lock plate is moved in the discharge direction of the cartridge in a state in which the discharge control mechanism abuts against a release shaft,
the locking mechanism is set to be in the lock-released state,
the lock plate is further moved in the discharge direction of the cartridge, and
the cartridge is pressed by the pressing mechanism in the discharge direction.

9. The cartridge drive apparatus according to claim 7, wherein
the lock plate is moved in the discharge direction of the cartridge,
the discharge control mechanism is slid on a reset shaft after the discharge control mechanism is released from the abutting state against the release shaft, and
the discharge control mechanism is restored to an initial position.

* * * * *